US008264169B2

(12) United States Patent
Shteynberg et al.

(10) Patent No.: US 8,264,169 B2
(45) Date of Patent: *Sep. 11, 2012

(54) TIME DIVISION MODULATION WITH AVERAGE CURRENT REGULATION FOR INDEPENDENT CONTROL OF ARRAYS OF LIGHT EMITTING DIODES

(75) Inventors: Anatoly Shteynberg, San Jose, CA (US); Harry Rodriguez, Gilroy, CA (US)

(73) Assignee: Point Somee Limited Liability Company, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/019,764

(22) Filed: Feb. 2, 2011

(65) Prior Publication Data

US 2011/0187276 A1 Aug. 4, 2011

Related U.S. Application Data

(62) Division of application No. 11/603,689, filed on Nov. 21, 2006, now Pat. No. 7,902,771.

(51) Int. Cl.
*H05B 37/00* (2006.01)

(52) U.S. Cl. .................... 315/307; 315/185 R; 315/192; 315/308

(58) Field of Classification Search ............. 315/185 R, 315/186, 187, 193, 191, 294, 295, 307, 308, 315/291
See application file for complete search history.

(56) References Cited

U.S. PATENT DOCUMENTS

| 4,302,712 | A | 11/1981 | Pritchard |
| 5,694,208 | A | 12/1997 | Ichikawa |
| 7,492,108 | B2* | 2/2009 | Garcia et al. .................. 315/291 |
| 7,902,771 | B2* | 3/2011 | Shteynberg et al. .......... 315/307 |
| 2005/0151489 | A1 | 7/2005 | Lys |
| 2006/0192663 | A1 | 8/2006 | Bryan |
| 2006/0211055 | A1 | 9/2006 | Hafeman |
| 2006/0220571 | A1 | 10/2006 | Howell |

OTHER PUBLICATIONS

International Search Report mailed Jan. 5, 2009, issued in corresponding International Application No. PCT/US07/23721, filed Nov. 13, 2007, 4 pages.

* cited by examiner

*Primary Examiner* — David Hung Vu
(74) *Attorney, Agent, or Firm* — Christensen O'Connor Johnson Kindness PLLC

(57) ABSTRACT

Representative method and computer-readable medium embodiments provide for sourcing current to a series of light emitting diodes in a plurality of series of light emitting diodes. A representative method comprises generating a current, sequentially and separately switching the current to each of the series of light emitting diodes in the plurality of series of light emitting diodes for a corresponding period of time, and predicting an output voltage across a selected series of light emitting diodes using a plurality of parameters stored in a memory.

28 Claims, 12 Drawing Sheets

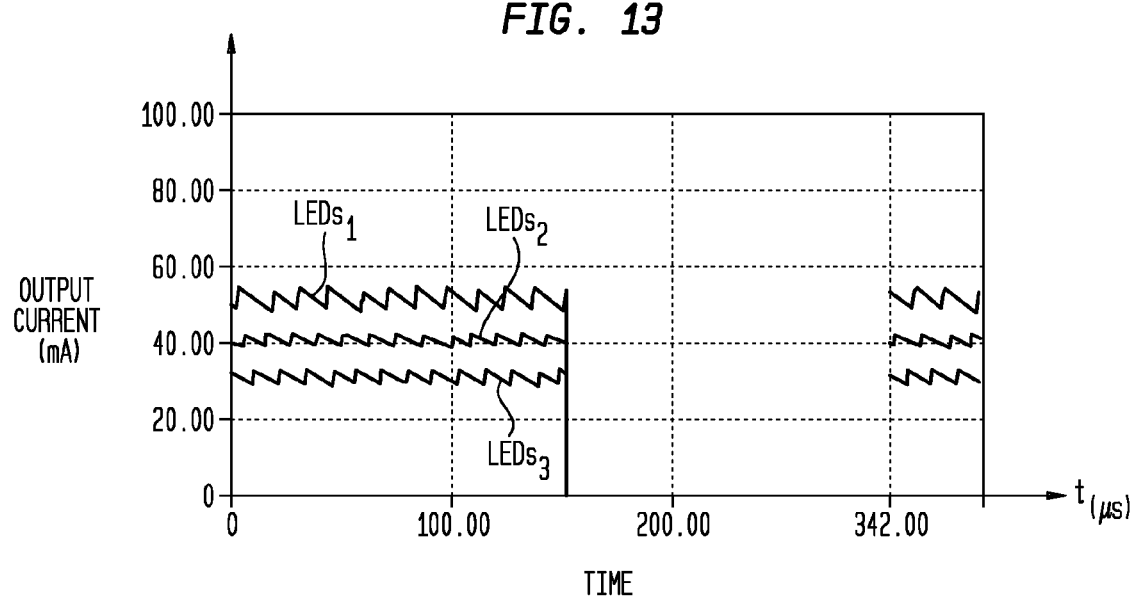

TIME DIVISION MODULATION WITH AVERAGE CURRENT REGULATION FOR INDEPENDENT CONTROL OF ARRAYS OF LIGHT EMITTING DIODES

CROSS-REFERENCE TO A RELATED APPLICATION

This application is related to and is a division of U.S. patent application Ser. No. 11/603,689, filed Nov. 21, 2006, now U.S. Pat. No. 7,902,771, inventors Anatoly Shteynberg et al., entitled "Time Division Modulation With Average Current Regulation for Independent Control of Arrays of Light Emitting Diodes", which is commonly assigned herewith, the contents of which is incorporated herein by reference with the same full force and effect as if set forth in its entirety herein, and with priority claimed for all commonly disclosed subject matter.

BACKGROUND

Arrays of light emitting diodes ("LEDs") are utilized for a wide variety of applications, including for ambient lighting. To achieve emission of light perceived as white light, LED arrays typically utilize a combination of red, green, and blue ("RGB") LEDs (and, occasionally, amber LEDs), usually as a first series connection (a first "string") of a plurality of red LEDs, a second series connection (a second string) of a plurality of green LEDs, and a third series connection (a third string) of a plurality of blue LEDs, which are typically referred to as "multistring LEDs".

For driving an array of LEDs, electronic circuits typically employ a converter to transform an AC input voltage (e.g., "AC mains") and provide a DC voltage source, with a linear regulator then being used to regulate LED current. For example, in Mueler et al., U.S. Pat. No. 6,016,038, entitled "Multicolored LED Lighting Method and Apparatus", the LEDs may be controlled by a processor to alter the brightness and/or color of the generated light, such as by using pulse-width modulated ("PWM") signals.

Multistring LED Drivers with PWM regulation are known, e.g., Subramanian Muthu, Frank J. P. Schuurmans, and Michael D. Pashly "Red, Blue, and Green LED for White Light Illumination", *IEEE Journal on Selected Topics in Quantum Electronics*, Vol. 8, No. 2, March/April 2002, pp. 333-338. Such multistring LED drivers typically require redundant drivers for every LED string. For example, in the system illustrated in FIG. 1, three separate and independent flyback converters 10 operating at a constant switching frequency of 100 kHz drive a corresponding string of an RGB LED light source 15, with a PWM 20 driving scheme operating at a frequency of 120 Hz. Each flyback converter 10 contains a current loop to maintain a constant peak current for the PWM pulses. The color control system is implemented in a DSP controller 25 (TMS320F240), which supplies the PWM turn-on and turn off signals for the power supply.

A similar approach using redundant drivers for multistring LEDs is suggested in Chang et al., U.S. Pat. No. 6,369,525, entitled "White Light Emitting Diode Lamp Driver Based on Multiple Output Converter with Output Current Mode Control," which utilizes a white LED array driver circuit with a multiple output flyback (or forward) converters with output current mode control, as illustrated in FIG. 2. The circuit 40 comprises a power supply source, and a transformer having a primary winding 41 and multiple secondary windings 42, with each light emitting diode string coupled in the circuit to one of the secondary windings. A main controller 43 is coupled to a first of the light emitting diode strings 46 and is configured to control a flow of current to the primary transformer winding 41. The circuit also comprises an additional plurality of secondary controllers 44, 45, each of which is correspondingly coupled to another light emitting diode string 47, 48 to control a flow of current to its corresponding light emitting diode string.

An analog implementation of this teaching can be found in the AS3691 product from Austriamicrosystems (LEDs Magazine 2005). The AS3691 includes four independent high precision current sources each capable of sinking 400 mA. The operating current per LED channel can be set via an external resistor, while the LED brightness is controlled by four independent pulse width modulated inputs. The AS3691 integrates four independent current sinks per chip, enabling it to drive either four white LEDs each sinking 400 mA or a single white LED with up to 1.6 A.

Another method utilizes multiple, separate linear regulators, with each regulator separately coupled to an LED string of an LED array. For example, an AC-to-DC converter, for transforming AC input voltage into a DC voltage source, is coupled to multiple, dedicated linear regulators, with one regulator coupled to each LED string to regulate the current in that corresponding LED string. This approach represents a multistage power system with low efficiency of power conversion, in addition to already low efficiency of series pass current regulators, particularly when the DC voltage is constant and does not depend on current. This method of multiple and separate linear regulators is illustrated in the following U.S. Pat. Nos. 7,064,498 Light Emitting Diode Based Products; 7,038,399 Methods And Apparatus For Providing Power To Lighting; 6,965,205 Light Emitting Diode Based Products; 6,806,659 Multicolored LED Lighting Method And Apparatus; 6,801,003 Systems And Methods For Synchronizing Lighting Effects; 6,788,011 Multicolored LED Lighting Method And Apparatus; 6,720,745 Data Delivery Track; 6,636,003 Apparatus And Method For Adjusting The Color Temperature Of White Semiconductor Light Emitters; 6,624,597 Systems And Methods For Providing Illumination In Machine Vision Systems; 6,548,967 Universal Lighting Network Methods And Systems; 6,528,954 Smart Light Bulb; 6,459,919 Precision Illumination; 6,340,868 Illumination Components; 6,292,901 Power/Data Protocol; 6,211,626 Illumination Components; 6,166,496 Lighting Entertainment System; and 6,150,774 Multicolored LED Lighting Method And Apparatus.

Similarly, in U.S. Pat. No. 6,016,038, entitled "Multicolored LED Lighting Method and Apparatus," each LED string of the LED array is controlled by a separate current regulator with a processor, to alter the brightness and/or color of the generated light using pulse-width modulated signals. In this case, an additional, current sink stage is added in series with each LED string current regulator, resulting in a further decrease in efficiency, particularly when the current sink is used to bypass the LED current to ground when the LED should be off. This multistage power system, with dedicated current converters and controllers in each LED channel, in addition to low efficiency, has a large size, many expensive components, and is expensive to manufacture.

Lastly, in Archenhold et al. U.S. Pat. No. 6,963,175, entitled "Illumination Control System," a light emitting diode illumination control system is disclosed for driving a current circuit for energizing one or more LED light sources. The system comprises a control system including a microprocessor, arranged to control a pulse amplitude modulated (PAM) voltage controlled current circuit, and may employ a monitor for monitoring at least one ambient condition and a microprocessor operable to control the current circuit in response to the monitored conditions. This proposal has several significant problems: (1) the system is very complex, inefficient (for power conversion), has many expensive components, and is expensive to manufacture; (2) the current to emission (color) transfer function in emitting diodes is substantially nonlinear, leading to poor color control or requiring additional, undisclosed technical means for compensation for this nonlinearity (not suggested in the patent); and (3) the disclosed current source operates poorly, suffering from thermal dependency and requiring correction by a microprocessor.

The multi-output or separate power converters and controllers for each LED string of an LED array increases the cost and size of the LED driver, and reduces the functionality and efficiency of the driver. Accordingly, a need remains for a multistring LED driver which utilizes a single power converter and controller for an entire LED array and does not utilize these multiple, separate power converters and controllers for each LED string. Such a multistring LED driver should provide for independent current control for each LED string of the array, for corresponding effective color and brightness control. In addition, such an LED array driver should provide for local LED regulation, providing local compensation of LED emission due to age and drift of functional parameters, temperature changes of the LED junction, LED production characteristics variation, and variations of devices produced by different manufacturers. Such an LED array driver also should be backwards-compatible with legacy LED control systems.

SUMMARY

As discussed in greater detail below, the various embodiments of the disclosure provide innumerable advantages for energizing a plurality of series (strings) of LEDs, using a single power converter and controller for an entire LED array, and does not utilize multiple, separate power converters and controllers for each LED string. The representative embodiments provide a multistring LED driver which controls current independently for each series of LEDs of the array, for corresponding effective color and brightness control, among other features. In addition, the representative LED array drivers provide for local LED regulation, achieving local compensation of LED emission due to age and drift of functional parameters, temperature changes of the LED junction, LED production characteristics variation, and variations of devices produced by different manufacturers. The representative LED array drivers are also backwards-compatible with legacy LED control systems.

Providing such local regulation of LED arrays is a significant advance compared to the use of a central, overall system (or host) computer or microprocessor for certain types of remote regulation. The local regulation provided by the present disclosure enables a significantly faster response time, without requiring the communication protocols, and further provides a more comprehensive approach for maintaining selected color and brightness levels throughout the life span of the LEDs and corresponding changes in their functional parameters. Representative embodiments also may be implemented using comparatively lower cost controllers. When the representative embodiments are further implemented to be backwards-compatible with legacy control systems, the present disclosure frees the host computer for other tasks and allows such host computers to be utilized for other types of system regulation.

A representative apparatus embodiment, for providing current independently to a series of light emitting diodes of a plurality of series of light emitting diodes, comprises a power converter, a first multiplexer, and a controller. The power converter is couplable to the plurality of series of light emitting diodes, and the power converter is adapted to generate a current. The first multiplexer is also couplable to the plurality of series of light emitting diodes. The controller is coupled to the power converter and to the first multiplexer, and the controller is adapted to provide for sequential and separate switching of the current through the first multiplexer to each of the series of light emitting diodes, of the plurality of series of light emitting diodes, for a corresponding period of time. The controller is further adapted to provide for no switching of current through the first multiplexer to all remaining series of light emitting diodes while current is switched to a selected series of light emitting diodes of the plurality of series of light emitting diodes.

In representative embodiments, the controller is further adapted to determine an average current provided by the power converter as substantially or about equal to a sum of a plurality of corresponding currents through the plurality of series of light emitting diodes, and to determine a total period for switching current to all of the series of light emitting diodes of the plurality of series of light emitting diodes. The controller may also be adapted to determine a corresponding time period for switching current to a selected corresponding series of light emitting diodes as substantially (or about) equal to a proportion of the total period determined as a ratio of the corresponding current for the selected corresponding series of light emitting diodes to the average current provided by the power converter.

A representative apparatus embodiment may further include a memory coupled to the controller, with the memory adapted to store, as a look up table, a plurality of parameters corresponding to the plurality of series of light emitting diodes. In representative embodiments, the controller is further adapted to predict an output voltage across a selected series of light emitting diodes based on the device parameters stored in memory and to revise the predicted output voltage based upon a measured output voltage across a selected series of light emitting diodes.

The power converter may further comprise a first voltage divider, with the controller being further adapted to determine an input voltage across the first voltage divider. Similarly, the power converter may further comprise a current sensor, with the controller being further adapted to determine a peak input current through the current sensor. In addition, representative embodiments may also include a plurality of capacitors, with each capacitor of the plurality of capacitors couplable to a corresponding series of light emitting diodes of the plurality of series of light emitting diodes.

A representative apparatus embodiment may further include a plurality of second voltage dividers, with each second voltage divider couplable in parallel to a corresponding series of light emitting diodes of the plurality of series of light emitting diodes, with the controller being further adapted to determine a corresponding output voltage across the corresponding second voltage divider of the plurality of second voltage dividers. In representative embodiments, a second multiplexer may be coupled to the plurality of second voltage dividers and the controller, with the controller being further adapted to control switching of the second multiplexer to a selected second voltage divider of the plurality of second voltage dividers. Also in representative embodiments, a third multiplexer may be couplable to the plurality of series of light emitting diodes and coupled to the controller, with the controller being further adapted to control switching of the third multiplexer to a selected series of light emitting diodes of the plurality of series of light emitting diodes for measuring a corresponding current through the selected series of light emitting diodes.

In various representative embodiments, the controller may be further adapted to determine the corresponding period of time for switching of current to a selected series of light emitting diodes based on a comparison of the measured corresponding current to a predetermined current level for the selected series of light emitting diodes. In other embodiments, the controller may be further adapted to determine the corresponding period of time for switching of current to a selected series of light emitting diodes based on an integer multiple of a period of switching of the power converter, and may be further adapted to control switching of the first multiplexer to a selected series of light emitting diodes of the plurality of series of light emitting diodes when current through the power converter is substantially (or about) zero.

In various representative embodiments, the controller may be further adapted, in response to a first input, to adjust an output brightness of the plurality of series of light emitting diodes by modifying each corresponding period of time of current switching to each of the series of light emitting diodes. In addition, the controller may be further adapted, in response to a second input, to adjust an output color of the plurality of series of light emitting diodes by modifying at least one corresponding period of time of current switching to at least one of the series of light emitting diodes of the plurality of series of light emitting diodes.

In representative embodiments, the first multiplexer may comprise a plurality of switches, with each switch of the plurality of switches correspondingly couplable to a first, high side of a corresponding series of light emitting diodes of the plurality of series of light emitting diodes, or couplable to a second, low side of a corresponding series of light emitting diodes of the plurality of series of light emitting diodes. In other embodiments, the first multiplexer may comprise a plurality of first switches, with each switch of the plurality of first switches correspondingly couplable to a first, high side of a corresponding series of light emitting diodes of the plurality of series of light emitting diodes; and a plurality of second switches, with each switch of the plurality of second switches correspondingly couplable to a second, low side of a corresponding series of light emitting diodes of the plurality of series of light emitting diodes. In yet other embodiments, the first multiplexer may comprises a plurality of first switches, with each switch of the plurality of first switches correspondingly couplable to a first, high side of a corresponding series of light emitting diodes of the plurality of series of light emitting diodes; and a second switch couplable to the plurality of capacitors.

In representative embodiments, a lighting system comprises a plurality of series of light emitting diodes, a power converter, a first multiplexer, and a controller. The power converter is coupled to the plurality of series of light emitting diodes and is adapted to generate a current. The first multiplexer is coupled to the plurality of series of light emitting diodes. The controller is coupled to the power converter and to the first multiplexer, and the controller is adapted to provide for sequential and separate switching of the current through the first multiplexer to each of the series of light emitting diodes, of the plurality of series of light emitting diodes, for a corresponding period of time.

The representative embodiments further provide a method of selectively and independently providing power to a series of light emitting diodes of a plurality of series of light emitting diodes. The method comprises generating an input DC current having a first average level; and sequentially and separately switching the DC current to each of the series of light emitting diodes, of the plurality of series of light emitting diodes, for a corresponding period of time. The representative method may further include switching no current to all remaining series of light emitting diodes while switching the DC current to a selected series of light emitting diodes of the plurality of series of light emitting diodes.

In representative embodiments, the method may also include determining the first average level of DC current as substantially (or about) equal to a sum of a plurality of corresponding currents through the plurality of series of light emitting diodes, determining a total period for switching current to all of the series of light emitting diodes of the plurality of series of light emitting diodes, and determining a corresponding time period for switching current to a selected corresponding series of light emitting diodes as substantially or about equal to a proportion of the total period determined as a ratio of the corresponding current for the selected corresponding series of light emitting diodes to the average current provided by the power converter. A representative method may also include storing, as a look up table, a plurality of parameters corresponding to the plurality of series of light emitting diodes, and predicting an output voltage across a selected series of light emitting diodes, of the plurality of series of light emitting diodes, based on the stored device parameters. The representative method may further include measuring a corresponding output voltage for each series of light emitting diodes of the plurality of series of light emitting diodes; updating the predicted output voltage across a selected series of light emitting diodes, of the plurality of series of light emitting diodes, based on a corresponding measured output voltage; determining an input voltage; determining a peak input DC current; determining a corresponding output voltage for each series of light emitting diodes of the plurality of series of light emitting diodes; and/or measuring a corresponding current through each series of light emitting diodes of the plurality of series of light emitting diodes.

In other representative embodiments, the method may include determining the corresponding period of time for switching of current to a selected series of light emitting diodes based on a comparison of the measured corresponding current to a predetermined current level for the selected series of light emitting diodes, and/or determining the corresponding period of time for switching of current to a selected series of light emitting diodes based on an integer multiple of a period of switching of a power converter. In addition, the method may include switching current to a selected series of light emitting diodes of the plurality of series of light emitting diodes when the input DC current is substantially (or about) zero.

Another representative embodiment provides an apparatus for providing current independently to a series of light emitting diodes of a plurality of series of light emitting diodes, with the apparatus comprising a power converter, a first multiplexer, a memory, and a controller. The power converter is couplable to the plurality of series of light emitting diodes and is adapted to generate a current. The first multiplexer is also couplable to the plurality of series of light emitting diodes. The memory is adapted to store, as a look up table, a plurality of parameters corresponding to the plurality of series of light emitting diodes. The controller is coupled to the power converter, to the first multiplexer and to the memory, with the controller being adapted to provide for sequential and separate switching of the current through the first multiplexer to each of the series of light emitting diodes, of the plurality of series of light emitting diodes, for a corresponding period of time; the controller further adapted to determine an average current provided by the power converter as substantially or about equal to a sum of a plurality of corresponding currents through the plurality of series of light emitting diodes, to determine a total period for switching current to all of the series of light emitting diodes of the plurality of series of light emitting diodes, and to determine a corresponding time period for switching current to a selected corresponding series of light emitting diodes as substantially or about equal to a proportion of the total period determined as a ratio of the corresponding current for the selected corresponding series of light emitting diodes to the average current provided by the power converter.

Numerous other advantages and features of the present disclosure will become readily apparent from the following detailed description of the disclosure and the embodiments thereof, from the claims and from the accompanying drawings.

BRIEF DESCRIPTION OF THE DRAWINGS

The objects, features and advantages of the present disclosure will be more readily appreciated upon reference to the following disclosure when considered in conjunction with the accompanying drawings, wherein like reference numerals are used to identify identical components in the various views, and wherein reference numerals with alphabetic characters (with or without subscripts) are utilized to identify particular instantiations of a corresponding type of selected component in the various views, in which:

FIG. 13 is a graphical diagram illustrating simulation of LED current in a boost LED array driver circuit, for three LED strings, in accordance with the teachings of the present disclosure.

DETAILED DESCRIPTION

Figure 1:
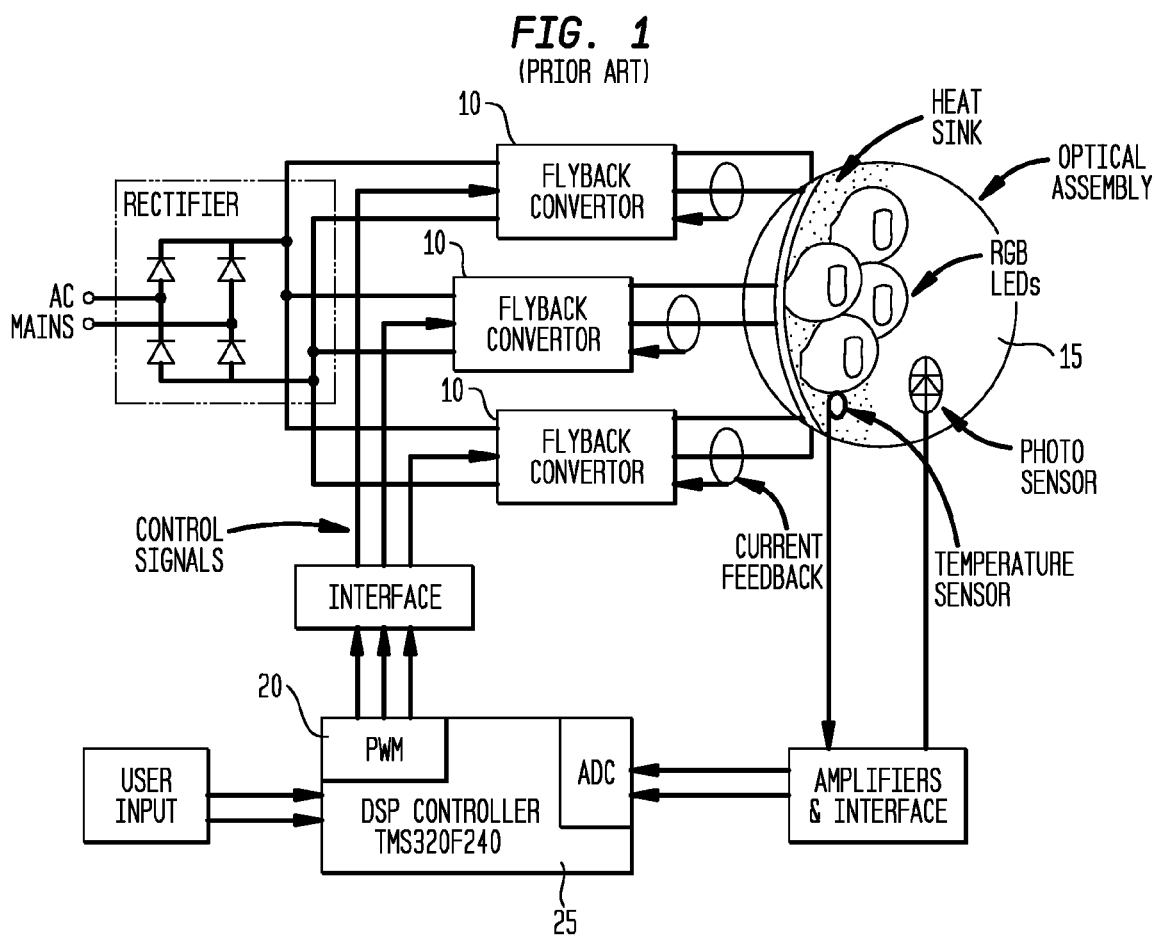
FIG. 1 is a prior art LED array driver.
Figure 2:
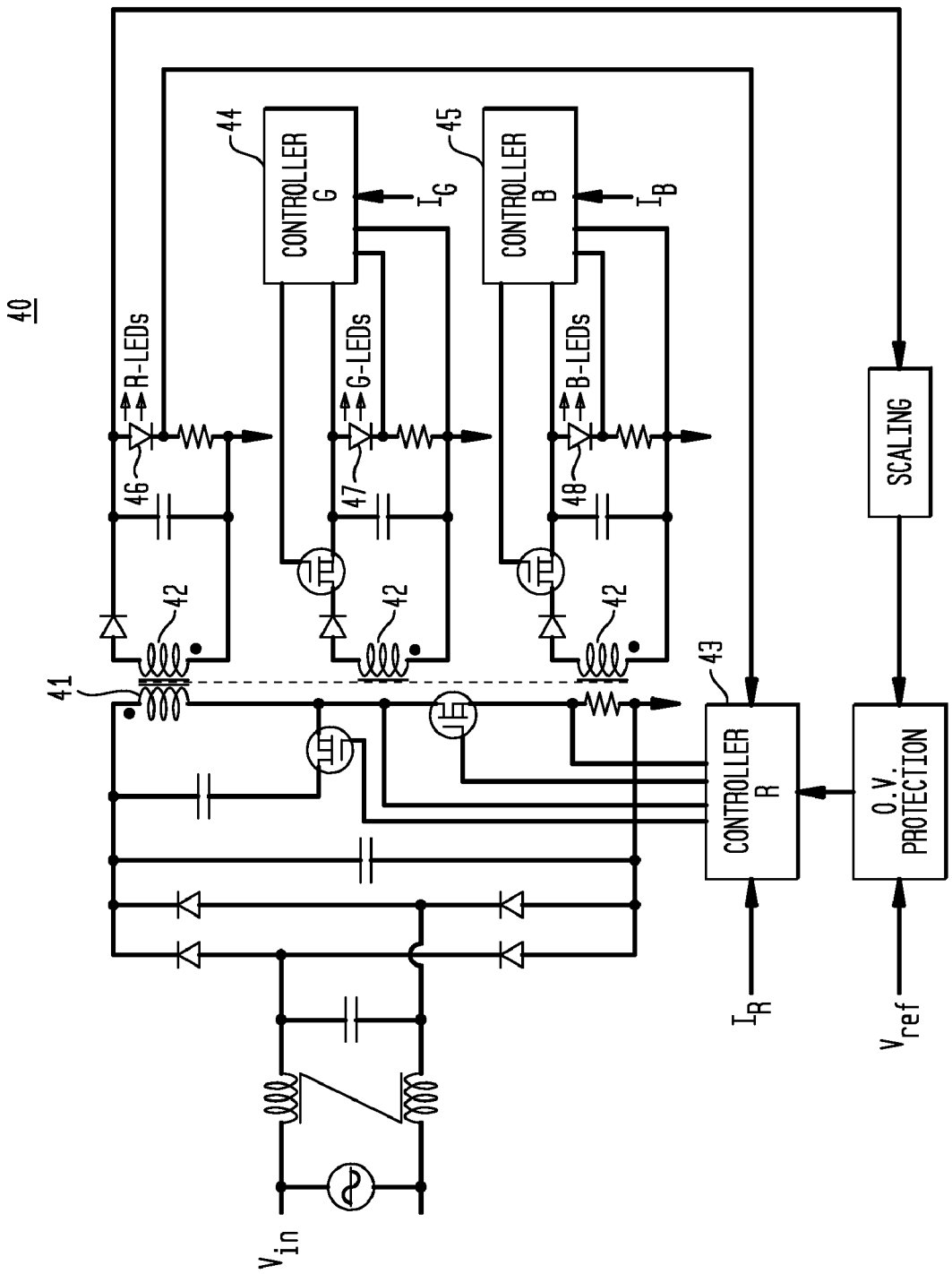
FIG. 2 is a prior art LED array driver.

While the present disclosure is susceptible of embodiment in many different forms, there are shown in the drawings, and will be described herein in detail, specific representative embodiments thereof, with the understanding that the present disclosure is to be considered as an exemplification of the principles of the disclosure and is not intended to limit the disclosure to the specific embodiments illustrated. In this respect, before explaining at least one embodiment consistent with the present disclosure in detail, it is to be understood that the disclosure is not limited in its application to the details of construction and to the arrangements of components set forth above and below, or as described and illustrated in the drawings. Apparatuses consistent with the present disclosure are capable of other embodiments and of being practiced and carried out in various ways. Also, it is to be understood that the phraseology and terminology employed herein, as well as the abstract included below, are for the purposes of description and should not be regarded as limiting.

Figure 3:
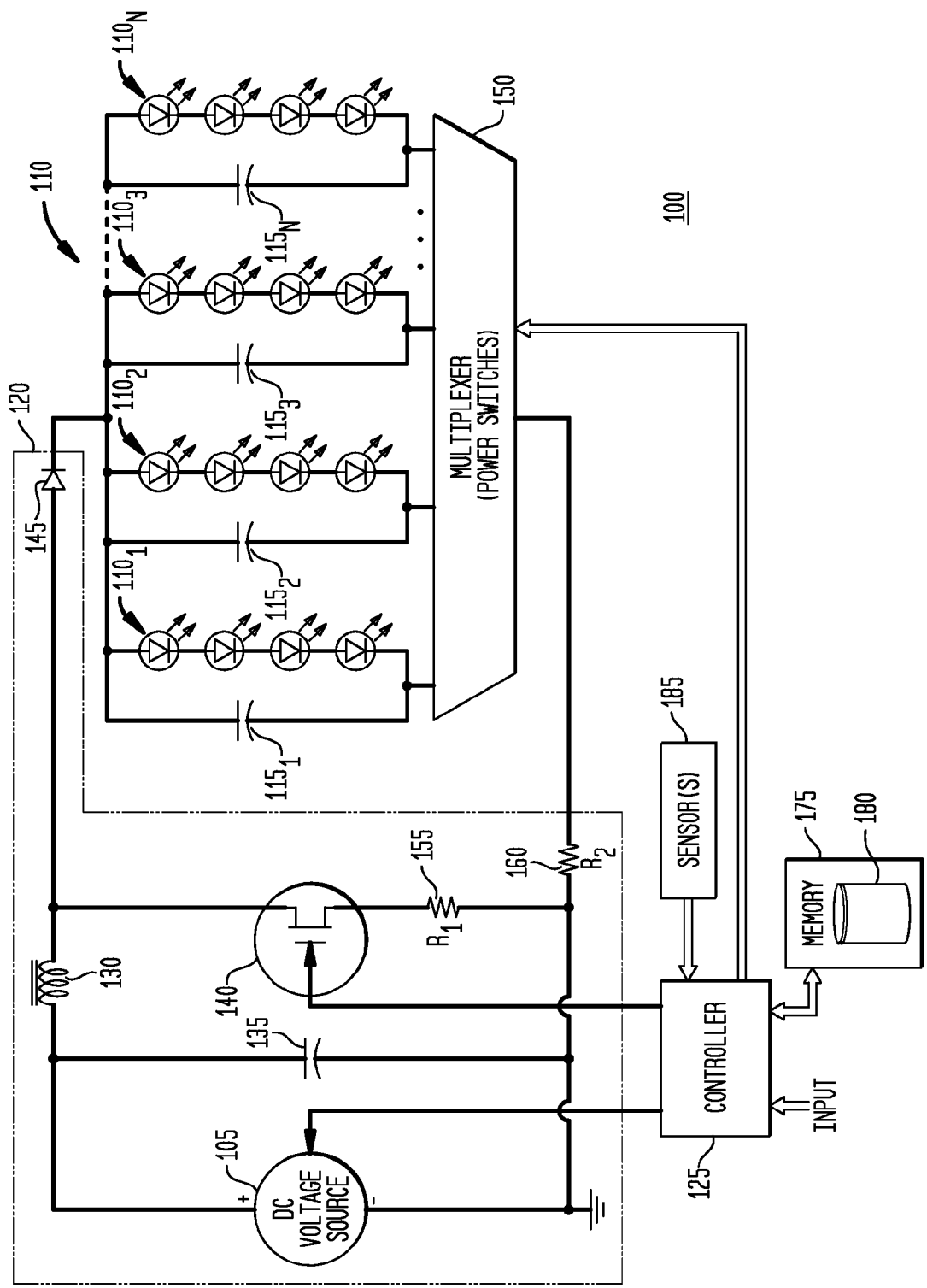
FIG. 3 is a circuit and block diagram illustrating a first representative LED array driver circuit in accordance with the teachings of the present disclosure.

Referring now to the Figures, wherein like reference numerals are used to identify identical components in the various views, and wherein reference numerals with alphabetic characters (with or without subscripts) are utilized to identify particular instantiations of a corresponding type of selected component in the various views, FIG. 3 is a circuit and block diagram illustrating a first representative LED array driver circuit 100 in accordance with the teachings of the present disclosure. The first representative LED array driver circuit 100 comprises a (switching) power converter 120, a parallel array of LEDs 110, a multiplexer (or other array of power switches) 150 (typically referred to as a first time-division multiplexer 150), a controller 125, and a memory 175. In representative embodiments, the representative LED array driver circuit 100 also comprises one or more sensors 185, discussed in greater detail below.

The parallel array of LEDs 110 comprises a plurality of series-connected LEDs, i.e., independent series or "strings" of LEDs, illustrated as "N" individual series of LEDs $110_1$, $110_2$, $110_3$, through $110_N$. Each such series of LEDs $110_1$, $110_2$, $110_3$, through $110_N$ may be referred to equivalently herein as a "channel," namely, channel one, channel two, channel three, through channel "N," respectively. The "channel" connotation is particularly appropriate for the present disclosure which, as discussed in greater detail below, provides for independently energizing each series of LEDs $110_1$, $110_2$, $110_3$, through $110_N$ using time-division modulation ("TDM," or equivalently, time-division multiplexing).

Each series of LEDs $110_1$, $110_2$, $110_3$, through $110_N$ may have either the same or different types of LEDs. For purposes of explanation and understanding of the present disclosure, and without limitation as to the scope of the disclosure, however, it may be assumed that each series of LEDs $110_1$, $110_2$, $110_3$, through $110_N$ have similar characteristics, such as by being fabricated by the same manufacturer and having only production or other manufacturing variations or tolerances. LEDs $110_1$, $110_2$, $110_3$, through $110_N$ having different characteristics, such as being produced by different manufacturers, may still be modeled appropriately, with corresponding information stored in the memory 175, and with all such variations considered equivalent and within the scope of the disclosure. As discussed in greater detail below, various models of LED operation and device characteristics are created and stored in memory 175, which may be any type or form of memory, and which further may comprise a look up table structure or a database 180 structure, for example, and without limitation.

Each such channel may also comprise a corresponding bypass filter capacitor 115 connected in parallel with each series of LEDs $110_1$, $110_2$, $110_3$, through $110_N$, illustrated as corresponding capacitors $115_1$, $115_2$, $115_3$, through $115_N$. The selection of the value of each corresponding capacitance, or the inclusion of any of the capacitors $115_1$, $115_2$, $115_3$, through $115_N$ altogether, is discussed in greater detail below.

The representative LED array driver circuit 100 further comprises a first, time-division or "energizing" multiplexer (or other array of power switches) 150, which provides for individually and selectively allowing current to flow through each of the series of LEDs $110_1$, $110_2$, $110_3$, through $110_N$, i.e., turning on or off any selected series of LEDs $110_1$, $110_2$, $110_3$, through $110_N$. Under the control of the controller 125, the multiplexer 150 is configured to allow current through one or more of the series of LEDs $110_1$, $110_2$, $110_3$, through $110_N$ in any combination, and for any selected duration (time period or time slot), such as one series of LEDs 110, two series of LEDs 110, none of the series of LEDs 110, or all of the series of LEDs 110, for example.

The illustrated representative power converter 120 comprises a DC voltage source 105, a filter capacitor 135, an inductor 130, a switch 140, a peak current sense resistor (R1) 155, and the controller 125. The power converter 120 may be of any topology which is capable of or adapted to deliver a controlled current level to a load, such as a current having a controlled peak to average current ratio, and may be isolated or non-isolated, including a Buck, Boost, Buck-Boost, or Flyback configuration or topology. The DC voltage source 105 may be a battery element or an AC/DC converter (not separately illustrated), such as a diode bridge or rectifier, or a more complex, off line switching power supply with power factor correction, for example. Also for example, the DC voltage source 105 may be an AC/DC converter connected to a phase modulation AC device (typically wall dimmer) via an impedance matching block, not separately illustrated. The power converter 120 may operate in a continuous mode of operation (illustrated in FIG. 5) or a discontinuous mode of operation (illustrated in FIG. 6).

The controller 125 may receive input from a wide variety of sources, including open or closed-loop feedback of various signals and measurements from within the LED array driver circuit 100, as discussed in greater detail below. Not separately illustrated, the controller 125 may be coupled within a larger system, such as a computer-controlled lighting system in a building, and may interface with other computing elements using a wide variety of data transmission protocols, such as DMX 512, DALI, IC squared, etc.

The memory 175, which may include a data repository (or database) 180, may be embodied in any number of forms, including within any computer or other machine-readable data storage medium, memory device or other storage or communication device for storage or communication of information, currently known or which becomes available in the future, including, but not limited to, a memory integrated circuit ("IC"), or memory portion of an integrated circuit (such as the resident memory within the controller 125 or processor IC), whether volatile or non-volatile, whether removable or non-removable, including without limitation RAM, FLASH, DRAM, SDRAM, SRAM, MRAM, FeRAM, ROM, EPROM or $E^2$PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. In addition, such computer readable media includes any form of communication media which embodies computer readable instructions, data structures, program modules or other data in a data signal or modulated signal, such as an electromagnetic or optical carrier wave or other transport mechanism, including any information delivery media, which may encode data or other information in a signal, wired or wirelessly, including electromagnetic, optical, acoustic, RF or infrared signals, and so on. The memory 175 is adapted to store various look up tables, parameters, coefficients, other information and data, programs or instructions (of the software of the present disclosure), and other types of tables such as database tables, discussed below.

The controller 125 may be any type of controller or processor, and may be embodied as one or more controllers 125, adapted to perform the functionality discussed below. As the term controller or processor is used herein, the controller 125 may include use of a single integrated circuit ("IC"), or may include use of a plurality of integrated circuits or other components connected, arranged or grouped together, such as controllers, microprocessors, digital signal processors ("DSPs"), parallel processors, multiple core processors, custom ICs, application specific integrated circuits ("ASICs"), field programmable gate arrays ("FPGAs"), adaptive computing ICs, associated memory (such as RAM, DRAM and ROM), and other ICs and components. As a consequence, as used herein, the term controller (or processor) should be understood to equivalently mean and include a single IC, or arrangement of custom ICs, ASICs, processors, microprocessors, controllers, FPGAs, adaptive computing ICs, or some other grouping of integrated circuits which perform the functions discussed below, with associated memory, such as microprocessor memory or additional RAM, DRAM, SDRAM, SRAM, MRAM, ROM, FLASH, EPROM, or $E^2$PROM. A controller (or processor) (such as controller 125), with its associated memory, may be adapted or configured (via programming, FPGA interconnection, or hard-wiring) to perform the methodology of the disclosure, as discussed below. For example, the methodology may be programmed and stored, in the controller 125 with its associated memory (and/or memory 175) and other equivalent components, as a set of program instructions or other code (or equivalent configuration or other program) for subsequent execution when the processor is operative (i.e., powered on and functioning). Equivalently, when the controller 125 may be implemented in whole or part as FPGAs, custom ICs and/or ASICs, the FPGAs, custom ICs or ASICs also may be designed, configured and/or hard-wired to implement the methodology of the disclosure. For example, the controller 125 may be implemented as an arrangement of controllers, microprocessors, DSPs and/or ASICs, collectively referred to as a "controller", which are respectively programmed, designed, adapted or configured to implement the methodology of the disclosure, in conjunction with the memory 175.

As indicated above, the controller 125 is programmed, using software and data structures of the disclosure, for example, to perform the methodology of the present disclosure. As a consequence, the system and method of the present disclosure may be embodied as software which provides such programming or other instructions, such as a set of instructions and/or metadata embodied within a computer readable medium, discussed above. In addition, metadata may also be utilized to define the various data structures of a look up table or the database 180. Such software may be in the form of source or object code, by way of example and without limitation. Source code further may be compiled into some form of instructions or object code (including assembly language instructions or configuration information). The software, source code or metadata of the present disclosure may be embodied as any type of code, such as C, C++, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, a "construct," "program construct," "software construct," or "software," as used equivalently herein, means and refers to any programming language, of any kind, with any syntax or signatures, which provides or can be interpreted to provide the associated functionality or methodology specified (when instantiated or loaded into a processor or computer and executed, including the controller 125, for example).

The software, metadata, or other source code of the present disclosure and any resulting bit file (object code, database, or look up table) may be embodied within any tangible storage medium, such as any of the computer or other machine-readable data storage media, as computer-readable instructions, data structures, program modules or other data, such as discussed above with respect to the memory 175, e.g., a floppy disk, a CDROM, a CD-RW, a DVD, a magnetic hard drive, an optical drive, or any other type of data storage apparatus or medium, as mentioned above.

Figure 4:
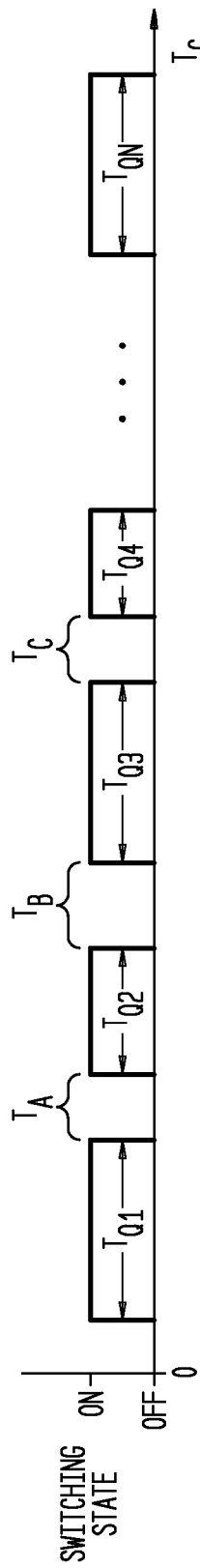
FIG. 4 is a timing diagram for a first representative LED array driver circuit in accordance with the teachings of the present disclosure.

FIG. 4 is a timing diagram for the first representative LED array driver circuit 100, and illustrates the time division modulation for current regulation in accordance with the teachings of the present disclosure. As illustrated, each series of LEDs $110_1$, $110_2$, $110_3$, through $110_N$ will be provided with a selected and independent current level, through control (by controller 125) of the switching state of each channel (via multiplexer 150), for a selected time period (or duration), illustrated as first time period $T_{Q1}$ for series of LEDs $110_1$, second time period $T_{Q2}$ for series of LEDs $110_2$, third time period $T_{Q3}$ for series of LEDs $110_3$, fourth time period $T_{Q4}$ for series of LEDs $110_4$, through "$N^{th}$" time period $T_{QN}$ for series of LEDs $110_N$. The total time period for providing current to all of the series of LEDs $110_1$, $110_2$, $110_3$, through $110_N$ is referred to herein as "$T_c$." Each of these time periods may be selected and varied during operation of the LED array driver circuit 100, providing time division modulation. Each energizing time period may be provided in any order or combination; for example, series of LEDs $110_3$ may be provided with current for third time period $T_{Q3}$, followed by series of LEDs $110_2$ being provided with current for second time period $T_{Q4}$, followed by both series of LEDs $110_1$ and series of LEDs $110_N$ being provided with selected current levels for corresponding first and $N^{th}$ time periods $T_{Q1}$ and $T_{QN}$, respectively. In addition, the corresponding current levels provided during these time periods to each series of LEDs $110_1$, $110_2$, $110_3$, through $110_N$ may be selected and varied during operation of the LED array driver circuit 100, as discussed in greater detail below, additionally providing for the average current regulation of the present disclosure. The intervals or time periods (illustrated as $T_A$, $T_B$, and $T_C$) between successive energizing time periods $T_{Q1}$, $T_{Q2}$ through $T_{QN}$ may also be selected and varied, depending upon the selected embodiment.

Referring to the average DC current in each channel (series of LEDs $110_1$, $110_2$, $110_3$, through $110_N$) as $I_{Ci}$, (i.e., average DC current $I_{C1}$, for series of LEDs $110_1$, average DC current $I_{C2}$ for series of LEDs $110_2$, average DC current $I_{C3}$ for series of LEDs $110_3$, through average DC current $I_{CN}$ for series of LEDs $110_N$), then the average current $I_C$ provided by the current source (in this case, power converter 120) is equal to $$I_c = \sum_{i=1}^{i=n} I_{ci}.$$

With a period of time "$T_c$" to provide current (energize) all of the LED channels (all of the series of LEDs $110_1$, $110_2$, $110_3$, through $110_N$), then the time of energizing each channel (series of LEDs 110) will be $$T_{Qi} = \frac{I_{ci} T_c}{I_c}.$$

Referring to the switching cycle of power converter 120 as "T," then $$T_{Qi} = m_i T,$$

where $m_i$ is the number of cycles of the power converter 120 per channel (series of LEDs 110). In representative embodiments, although not required, the period of time $T_c$ and the cycle time T is selected such that $m_i$ is an integer.

EXAMPLE 1

For a system having three series of LEDs $110_1$, $110_2$, and $110_3$, with average channel currents initially set as $I_{c1}=500$ mA, $I_{c2}=520$ mA, and $I_{c3}=480$ mA, then $I_c=500+520+480=1500$ mA. Assuming $T_c=1000$ μs and T=1 μs, under the control of the controller 125 directing switching through multiplexer 150, the power converter 120 will supply to each channel a current of 1500 mA for the run times $$T_{Q1} = \frac{500 \cdot 1000}{1500} = 333 \ \mu s,$$

$$T_{Q2} = \frac{520 \cdot 1000}{1500} = 347 \ \mu s, \text{ and}$$

$$T_{Q3} = \frac{480 \cdot 1000}{1500} = 320 \ \mu s$$

which will result in the following number of cycles of the power converter 120:

$$m_1=333, m_2=347, \text{ and } m_3=320.$$

Continuing with the example, we may now suppose that for any of various reasons, such as a change in junction temperature, a change in color output, etc., the current in channel one (series of LEDs $110_1$) is only to be adjusted to 275 mA, while the previous current levels are to be maintained in the remaining channels 2 and 3 (series of LEDs $110_2$ and series of LEDs $110_3$). Accordingly, the total average DC current to be provided by the power converter 120 is now $I_c=275+520+480=1275$ mA, resulting in:

$$T_{Q1} = \frac{275 \cdot 1000}{1275} = 216 \ \mu s,$$

$$T_{Q2} = \frac{520 \cdot 1000}{1275} = 408 \ \mu s, \text{ and}$$

$$T_{Q3} = \frac{480 \cdot 1000}{1275} = 376 \ \mu s,$$

with $m_1 = 216$, $m_2 = 408$, and $m_3 = 376$.

A representative boost converter may be utilized to generate the required average current $I_c$ in every channel. In addition to those illustrated below in the Examples, those skilled in the art may derive similar equations for other power converter (or current source) topologies.

EXAMPLE 2

Figure 5:
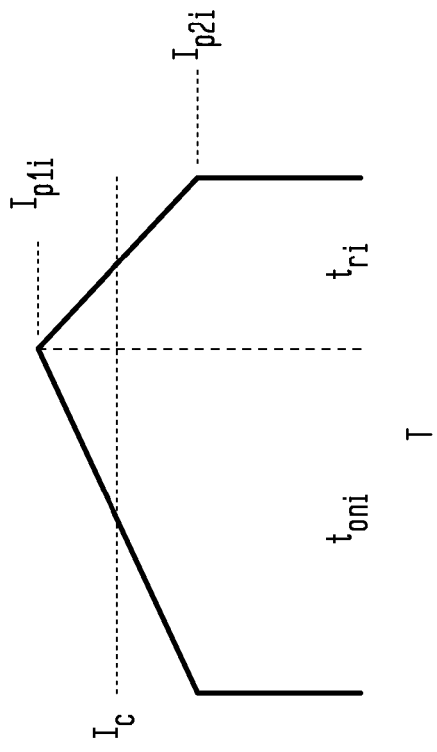
FIG. 5 is a diagram illustrating continuous current in an inductor in a first representative LED array driver circuit in accordance with the teachings of the present disclosure.

For a continuous conduction mode ("CCM"), as illustrated in FIG. 5, $$I_c \approx \frac{I_{p1i} + I_{p2i}}{2} \frac{t_{ri}}{T},$$

where $I_{p1i}$—First peak current, Channel i;

$I_{p2i}$—Second peak current, Channel i; and $t_{ri}$—reset time, Channel i.

Two variables are introduced for ease of explanation and derivation of equations, as follows:

$$a_i = \frac{I_{p2i}}{I_{p1i}},$$

namely, the ratio of the second peak current to the first peak current for a selected ith channel, and $$b_i = \frac{t_{ri}}{T},$$

namely, the ratio of the switch 140 reset time (i.e., off or open time) to the total cycle time, resulting in a first peak current for an ith channel of:

$$I_{p1i} = \frac{2I_c}{(1+a_i)b_i}.$$

Another expression for the first peak current $I_{p1i}$ is:

$$I_{p1i} = I_{p2i} + \frac{V_{in} \cdot t_{oni}}{L}$$

where $V_{in}$—Input voltage from DC voltage source 105;

$t_{oni}$—on time, Channel I; and

L—inductance value of inductor 130

With substitutions $$I_{p1i} = \frac{V_{in} \cdot t_{oni}}{(1-a_i)L}$$

then one more expression for $I_{p1i}$ current is $$I_{p1i} = I_{p2i} + \frac{(V_{outi} - V_{in}) \cdot t_{ri}}{L}$$

where $V_{outi}$—output voltage, ith channel;

or $$I_{p1i} = \frac{(V_{outi} - V_{in}) \cdot t_{ri}}{(1-a_i)L}$$

From FIG. 5, for the continuous mode, we also have $T = t_{oni} + t_{ri}$, and the cycle time T is the same for all channels. Solving the above system of equations provides:

$$b_i = \frac{V_{in}}{V_{outi}}$$

and $$a_i = \frac{2I_c \cdot L - (V_{outi} - V_{in})b_i^2 T}{2I_c L + (V_{outi} - V_{in})b_i^2 T}$$

As will be apparent from the derivation above, constant values may be known or selected for the inductance L of inductor 130, the cycle time T for the power converter 120, and the average DC current $I_c$ with corresponding values stored in memory 175. Using coefficients $a_i$ and $b_i$ as an example, allows the computation (by controller 125) of the values of the first and second peak currents per channel, $I_{p1i}$ and $I_{p2i}$, for operation of the power converter 120, provided the input and output voltages are known. Input voltage $V_{in}$ (from DC voltage source 105) can be measured (e.g., through a sensor 185), selected or otherwise predetermined, with a value stored in memory 175. Initially, however, the output voltage $V_{outi}$ across an individual series of LEDs 110 cannot be measured, because the computations occur before the power converter 120 provides current to the series of LEDs 110. In accordance with the present disclosure, therefore, the output voltage for a channel $V_{outi}$ is initially predicted by employing digital models of the LEDs 110, with such models (as parameters) stored in memory 175 and utilized by the controller 125. Knowing the DC current through a selected series of LEDs 110, $I_{ci}$, and using device specifications, data sheets, or other data provided by the LED device manufacturer, the output voltage (i.e., voltage drop) across each of the series of LEDs 110, as a function of forward current, may be determined and provided in the form of a look up table stored in memory 175, in graphical form, or any in other form known to those skilled in the digital electronics design arts.

This more theoretical prediction, however, may have an error component, due to manufacturing tolerances, age, junction temperature related drift, or any other physical parameter or variable of LED performance, leading to a forward voltage change. In accordance with the representative embodiments of the present disclosure, the actual output voltage across each series of LEDs $110_1$, $110_2$, $110_3$, through $110_N$ is also measured using a sensor 185. Corresponding to such measurements, compensation coefficients are introduced, stored in memory 175, and utilized for subsequent output voltage prediction by the controller 125, for use in successive iterations (i.e., successive time periods "$T_A$, $T_B$, $T_C$"), as discussed above. These compensation coefficients can be saved and stored for each channel, and may be updated periodically (comparatively infrequently), as they are associated with LED 110 device parameters which change comparatively slowly.

EXAMPLE 3

Figure 6:
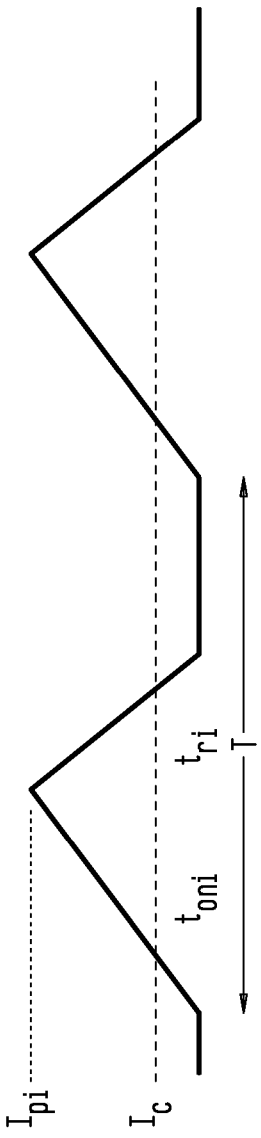
FIG. 6 is a diagram illustrating discontinuous current in an inductor in a first representative LED array driver circuit in accordance with the teachings of the present disclosure.

For a discontinuous conduction mode ("DCM"), as illustrated in FIG. 6, peak current $I_{p1i}$ is defined as $$I_{p1i} = \frac{2I_c T}{t_{ri}}$$

Also, for a boost configuration using DCM:

$$I_{p1i} = \frac{V_{in} \cdot t_{oni}}{L}$$

and volt-seconds balance across inductor 130 is:

$$V_{in} \cdot t_{oni} = (V_{outi} - V_{in}) \cdot t_{ri}$$

The peak current $I_{p1i}$ is then:

$$I_{p1i} = \frac{2I_c \cdot V_{outi}}{V_{in}}$$

The technique of generating the value of the output voltage $V_{outi}$ is the same as described above for CCM of operation. The boundary between CCM and DCM may be found analytically by solving the following equation, or by determining if the actual cycle time, after current discharge by the inductor 130 is completed, is equal to the set cycle time T:

$$T = \frac{2I_c L V_{outi}^2}{V_{in}^2 (V_{outi} - V_{in})}$$

The amplitude of voltage ripple $\Delta V_i$ in a selected channel i is given by the following relationship, from which the capacitance values of capacitors 115 may be determined:

$$\Delta V_i = \frac{I_c \cdot T_{Qi}^2}{C_i \cdot T_c}$$

Referring again to FIG. 3, the controller 125 receives one or more inputs from any of various sources, such as from one or more sensors 185, or from other systems, such as a master lighting controller or control system (not separately illustrated), using any type of communication protocol, such as accommodating a standard interface between digital controllers such as DMX512, DALI, IC squared, radio frequency, Ethernet and many other communication protocols and/or interfaces.

The various sensors 185 may be analog and/or digital, and will be coupled to corresponding input ports of the controller 125. For example, an analog peak current may be measured (e.g., across resistor 155, which functions as a peak current sensor), and converted (utilizing an analog to digital converter, not separately illustrated), to provide a digital value of peak current for storage in memory 175. Such a measured peak current value may be compared within controller 125, such as through a comparator (not separately illustrated), with corresponding control provided by the controller 125 to the DC voltage source 105 and/or switch 140 to adjust peak current levels. As indicated above, LED models, other parameters, specifications, coefficients, etc., are stored in digital form in memory 175. The controller 125 also generally includes buffer (or other driver) circuits to provide the switching control for the multiplexer (or other power switches) 150 and the switching (of switch 140) of the representative LED array driver circuit 100.

The various sensors 185 providing input to analog and/or digital ports of the controller 125 generate sense signals from each channel, the representative LED array driver circuit 100 environment, and potentially the larger lighting system environment. Representative sensors 185, for example and without limitation, may be sensors for: electrical (output voltage, string current), optical (brightness, wavelengths emission, color temperature, chromaticity, radiant power, luminous power), thermal (junction temperature, ambient temperature), environmental (ambient lighting), mechanical (displacement, angular, strain, velocity, acceleration), magnetic, hall sensors, and more specific sensors providing signals related to the functional purposes of the system (e.g., residential illumination, architectural, signage, automotive lighting, backlighting, emergency lighting, naval lighting, and others).

In representative embodiments, the controller 125 receives input control signals and feedback (or sensed) signals to generate the average DC currents to be set for each channel $I_{ci}$ and the duty cycle for the time-division modulation average current control of the representative LED array driver circuit 100 in accordance with the present disclosure. For example, in a representative embodiment, DC currents $I_{ci}$ for each channel may be determined by control signals coming from an overall system controller, such as based upon the type or manufacture of LEDs used in the LED array 110 (series of LEDs $110_1$, $110_2$, $110_3$, through $110_N$). In another representative embodiment, DC currents $I_{ci}$ for each channel may be determined as a result of specific algorithms, with the controller 125 processing LED feedback (or sensed) information and adjusting the amplitude of average currents $I_{ci}$ to compensate for unwanted changes and age drift of the LED system in any area of electrical, optical, thermal, and functional performance. The controller 125 also utilizes the digital models of electrical behavior for each string of LEDs (series of $110_1$, $110_2$, $110_3$, through $110_N$) by supplying forward current using the models and determining error coefficients for each model by comparing the actual output voltages across each series of LEDs 110 (measured and fed back) with the predicted output voltages, as discussed above.

The controller 125 is also the functional controller of the converter 120, selecting the cycle time "T" of the converter 120 and determining the peak current for each channel $I_{p1i}$, based on its input signals, discussed above. The controller 125 also synchronizes this set value of the peak current with one of the active LED channels (series of LEDs 110), computes the energizing time periods or durations (on times or run times) of the channels, $T_{Qi}$, and controls the status of the multiplexer 150 switching according to these required energizing time periods (on times or run times) $T_{Qi}$, synchronizing such switching with the corresponding set values of $I_{p1i}$ for each series of LEDs $110_1$, $110_2$, $110_3$, through $110_N$.

Figure 7:
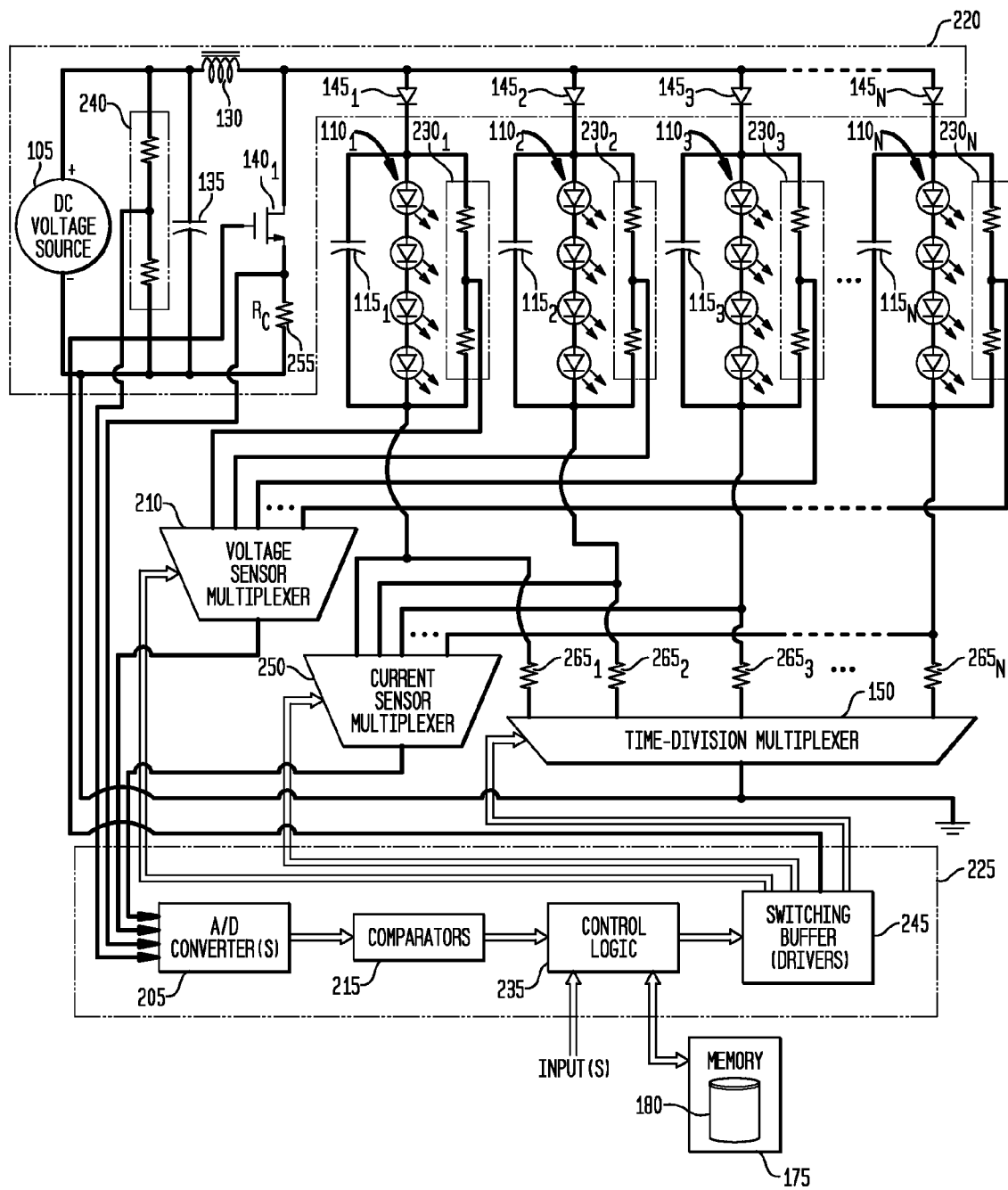
FIG. 7 is a circuit and block diagram illustrating a second representative LED array driver circuit in accordance with the teachings of the present disclosure.

FIG. 7 is a circuit and block diagram illustrating a second representative LED array driver circuit 200, implemented as a boost-type converter, in accordance with the teachings of the present disclosure. The second representative LED array driver circuit 200 comprises a (switching) power converter 220, a parallel array of LEDs 110 (series of LEDs $110_1$, $110_2$, $110_3$, through $110_N$) with corresponding bypass filter capacitors 115 and voltage dividers 230 (discussed below), a first, time-division multiplexer (or other array of power switches) 150, a second, current sense multiplexer 250, a third, voltage sense multiplexer 210, a controller 225, a memory 175, and a plurality of resistors 265 in series with each channel (illustrated as corresponding resistors $265_1$, $265_2$, $265_3$, through $265_N$. In representative embodiments, the second representative LED array driver circuit 200 and one or more of the sensors 185 are implemented, for example, utilizing voltage divider 240 and voltage dividers $230_1$, $230_2$, $230_3$, through $230_N$.

In addition to the features previously discussed for power converter 120, the power converter 220 further comprises a voltage divider 240, a (total) current sense resistor 255, and corresponding blocking (Schottky) diodes 145 (for each series of LEDs $110_1$, $110_2$, $110_3$, through $110_N$). In addition, a switch 140 is implemented as a MOSFET $140_1$, having its drain connected to inductor 130 and its source connected to the current sense resistor 255.

The parallel array of LEDs 110 also comprises a plurality of series-connected LEDs, i.e., independent series or "strings" of LEDs, illustrated as "N" individual series of LEDs $110_1$, $110_2$, $110_3$, through $110_N$, as previously discussed. Each such channel may also comprise a corresponding bypass filter capacitor 115 connected in parallel with each series of LEDs $110_1$, $110_2$, $110_3$, through $110_N$, illustrated as corresponding capacitors $115_1$, $115_2$, $115_3$, through $115_N$, as previously discussed. Each such channel also comprises a corresponding voltage divider 230 also connected in parallel with each series of LEDs $110_1$, $110_2$, $110_3$, through $110_N$, illustrated as corresponding voltage dividers $230_1$, $230_2$, $230_3$, through $230_N$. A plurality of corresponding output current sense resistors ($265_1$, $265_2$, $265_3$, through $265_N$) are also utilized, as illustrated.

The controller 225 has all of the functionality of the controller 125 previously discussed, plus the additional functionality discussed below. In addition to the time-division multiplexer (or other array of power switches) 150 and switch 140, the voltage sense multiplexer 210 and current sense multiplexer 250 are also under the control of the controller 225. As discussed above, the representative LED array driver circuit 200 further comprises a first, time-division or "energizing" multiplexer (or other array of power switches) 150, which provides for individually and selectively allowing current to flow through each of the series of LEDs $110_1$, $110_2$, $110_3$, through $110_N$, i.e., turning on or off any selected series of LEDs $110_1$, $110_2$, $110_3$, through $110_N$. Under the control of the controller 225, when the time division multiplexer 150 is switched to a selected LED series 110 (of the plurality of series of LEDs $110_1$, $110_2$, $110_3$, through $110_N$) for allowing current to flow through that selected LED series 110 for a selected period of time ($T_{ON}$), the voltage sense multiplexer 210 and current sense multiplexer 250 are concurrently switched for corresponding sensing of the voltage and current levels for the same selected LED series 110, as follows: (1) the voltage sense multiplexer 210 is concurrently switched to the voltage divider 230 which is coupled in parallel to the same selected LED series 110, for output voltage detection (sensing) for that selected channel; and (2) the current sense multiplexer 250 is also switched to the same selected LED series 110 for detection (sensing) of the current flowing through the selected LED series 110.

Functional blocks of the controller 225 are also illustrated in FIG. 7, including one or more analog-to-digital (A/D) converters 205, one or more comparators 215, control logic 235, and switching buffers (or drivers) 245 (for controlling the switching of the various multiplexers 150, 210, 250 for the time-division modulation of the present disclosure. As illustrated, corresponding voltages, representing: (1) input voltage (from voltage divider 240), (2) an output voltage across a selected series of LEDs $110_1$, $110_2$, $110_3$, through $110_N$ (from the corresponding voltage divider 230) selected via voltage sense multiplexer 210, (3) peak current (from current sense resistor 255), and (4) output current through a selected series of LEDs $110_1$, $110_2$, $110_3$, through $110_N$ (across output current sense resistors ($265_1$, $265_2$, $265_3$, through $265_N$) selected via current sense multiplexer 250), are provided to corresponding A/D converters 205, and are then correspondingly compared in comparators 215, with the corresponding results provided to control logic 235, for use in determining the current to be provided to each channel (driving the various multiplexers 150, 210 and 250 via switching buffers 245) for the corresponding time duration ($T_{ON}$) for the time-division modulation of the present disclosure, as discussed above. Not separately illustrated, the controller 225 may also include an oscillator (for clocking the various components) and a voltage regulator.

In this representative LED array driver circuit 200, using corresponding comparators 215 and control logic 235: (1) actual peak current (from current sense resistor 255) may be compared to the set or predetermined peak current (from an input or stored in memory 175), and if sufficiently different, adjusted accordingly; (2) actual output current through a selected series of LEDs $110_1$, $110_2$, $110_3$, through $110_N$ (across output current sense resistors ($265_1$, $265_2$, $265_3$, through $265_N$) may be compared to the corresponding set or predetermined output current (from an input or stored in memory 175), and if sufficiently different, adjusted accordingly; (3) input voltage (from voltage divider 240) may be compared to the set or predetermined input voltage level (from an input or stored in memory 175), and if sufficiently different, adjusted accordingly; and (4) an output voltage across a selected series of LEDs $110_1$, $110_2$, $110_3$, through $110_N$ (from the corresponding voltage divider 230) may be compared to the corresponding set or predetermined output voltage level (from an input or stored in memory 175), and if sufficiently different, adjusted accordingly.

The representative LED array driver circuit 200 is implemented based on the following hysteretic process of time-division modulation, comprising the following steps, implemented in the controller 225 and the other specified components:

(1) Setting values of DC currents in each channel, based on input signal.

(2) Calculating the source DC current $I_c$ as substantially or about equal to the sum of each channel DC current $I_{ci}$:

$$I_c \sum_{i=1}^{i=n} I_{ci}.$$

(3) Monitoring current in the inductor 130 of the power converter 220 and when this current is equal to zero, sequentially turning on the power switch of a selected series of LEDs $110_1$, $110_2$, $110_3$, through $110_N$ (the "active" string) via the time-division multiplexer 150, while keeping the rest of the power switches in an off state, also via the time-division multiplexer 150.

(4) Correspondingly and synchronously turning on the switches within voltage sense multiplexer 210 and current sense multiplexer 250, corresponding to the active string LEDs 110 (the selected series of $110_1$, $110_2$, $110_3$, through $110_N$), for the corresponding time-division modulation periods or durations.

(5) Monitoring the DC current level in the active string, and (a) if the current is higher than the corresponding predetermined or set value, deactivate the current series of LEDs 110 and activating the next series of LEDs 110 in the sequence; or (b) if the DC current level is less than the corresponding predetermined or set value, continuing the process of energizing the selected active series of LEDs 110.

(6) Measuring the operating input DC Voltage (across voltage divider 240).

(7) Measuring operating output voltage of the selected, active series of LEDs 110 (across a corresponding voltage divider 230).

(8) Calculating peak current of the power converter 220 according to $$I_{p1i} = \frac{2I_c \cdot V_{outi}}{V_{in}}.$$

(9) Alternatively the last three steps (6, 7, and 8 above) can be implemented by measuring the reset time $t_{ri}$; measuring actual cycle time T; and calculating the peak current of the converter 220 as $$I_{p1i} = \frac{2I_c T}{t_r}.$$

(10) Running converter 220 in constant peak current mode in the DCM mode with preselected constant cycle time and peak current value calculated separately for each string.

(11) Monitoring DC current in the active, selected series of LEDs $110_1$, $110_2$, $110_3$, through $110_N$: when DC current reaches the corresponding predetermined or set value, terminating the switching cycle of the converter 220, and if the switch $140_1$ is currently in an off state, waiting until current in the inductor 130 drops to about zero before starting the process of energizing the next selected series of LEDs $110_1$, $110_2$, $110_3$, through $110_N$; or if the switch $140_1$ is currently in an on state, turning the switch $140_1$ off (e.g., immediately) and then waiting until current in the inductor 130 drops to about zero before starting the process of energizing of the next selected series of LEDs $110_1$, $110_2$, $110_3$, through $110_N$.

(12) At the end of the sequence of energizing each of the series of LEDs $110_1$, $110_2$, $110_3$, through $110_N$, updating all parameters of the operation and driving of the representative LED array driver circuit 200 for each channel, and starting the next driving cycle of the representative LED array driver circuit 200.

The required DC current level of each series of LEDs $110_1$, $110_2$, $110_3$, through $110_N$ is supplied as input to control logic 235. The control logic 235 calculates the total equivalent DC current of the converter 220 for the total period T which will include a sequential activation of all series of LEDs 110. The peak current is adjusted for each series of LEDs 110 by measuring input voltage via voltage divider 240 and one of the A/D converters 205. Output voltage of the active, selected series of LEDs $110_1$, $110_2$, $110_3$, through $110_N$ is sensed by the corresponding voltage divider 230, selected via voltage sense multiplexer 210 and input to one of the A/D converters 205. The selection by the voltage sense multiplexer 210 is synchronized with the time division multiplexer 150, so only the active series of LEDs 110 (power switch is on) is selected for voltage sensing. The switch $140_1$ of the converter 220 is controlled by the switching buffers 245, based on determinations by the control logic 235, comparing the sensed peak current across resistor 255 with the predetermined or set value for each series of LEDs 110. The set value of peak current may be different for each series of LEDs 110, depending on its DC voltage and is determined by comparisons performed by control logic 235. Via switching buffers 245, the control logic 235 controls the switching status, switching selections, and switching synchronization of the time division multiplexer 150, the current sense multiplexer 250, and the voltage sense multiplexer 210, such that only the active series of LEDs 110 is sensed.

In this embodiment, the time periods for each of the series of LEDs 110 for the time division modulation is not required to be analytically determined. Because the DC current supplied by the converter 220 is much higher that any required DC current of the selected series of LEDs 110, the actual DC current in the active series of LEDs 110 will always be ramping up. Based on the monitored DC current in the active series of LEDs 110, when comparator 215 and/or control logic 235 identifies that the DC current in the active series of LEDs 110 is equal to the predetermined or set current value for the selected series of LEDs 110, that selected series of LEDs 110 will be deactivated. For example, threshold levels of the comparator 215 may be set to a unique value for each series of LEDs 110.

Figure 8:
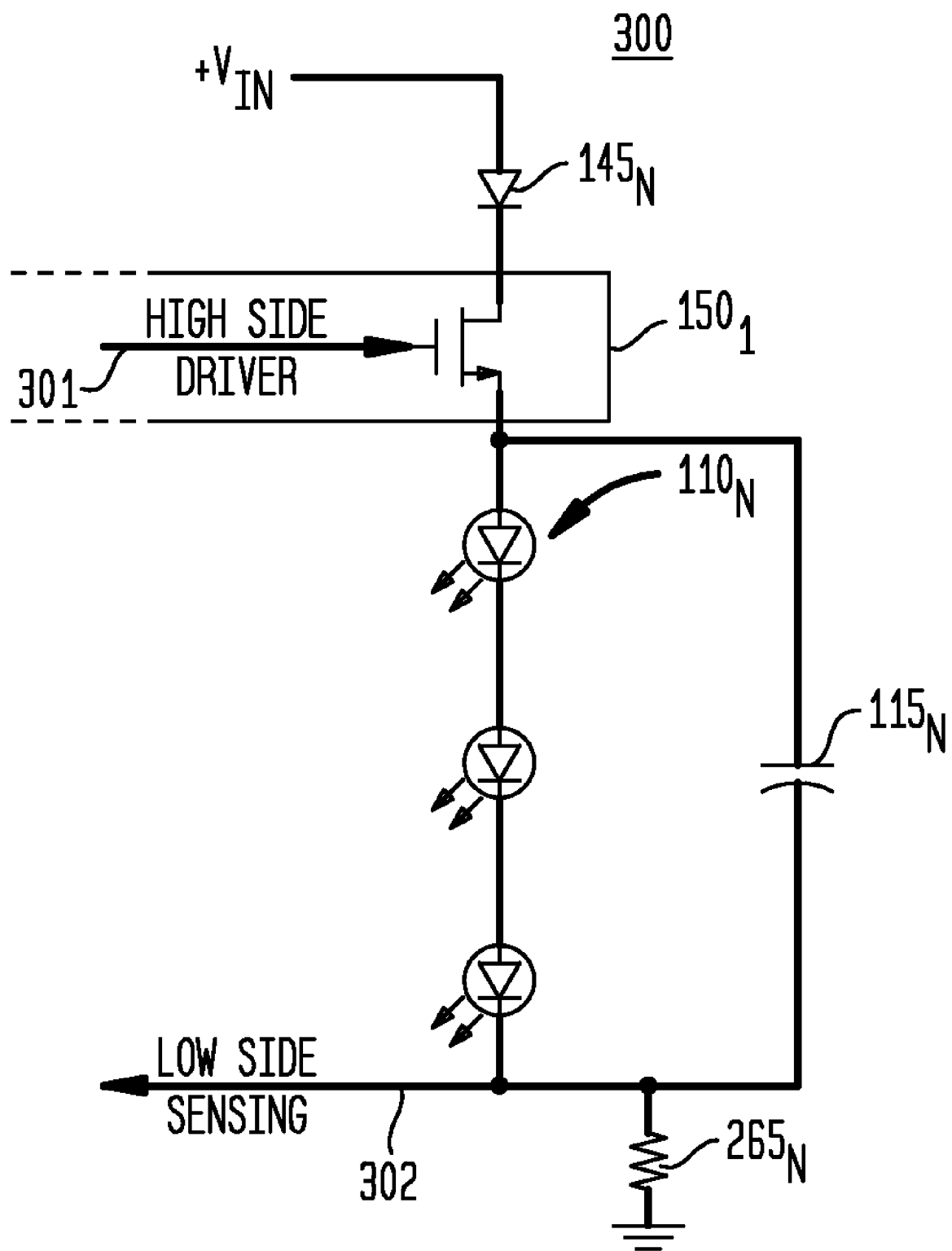
FIG. 8 is a circuit diagram illustrating high side driving and low side sensing of a series of LEDs in accordance with the teachings of the present disclosure.
Figure 9:
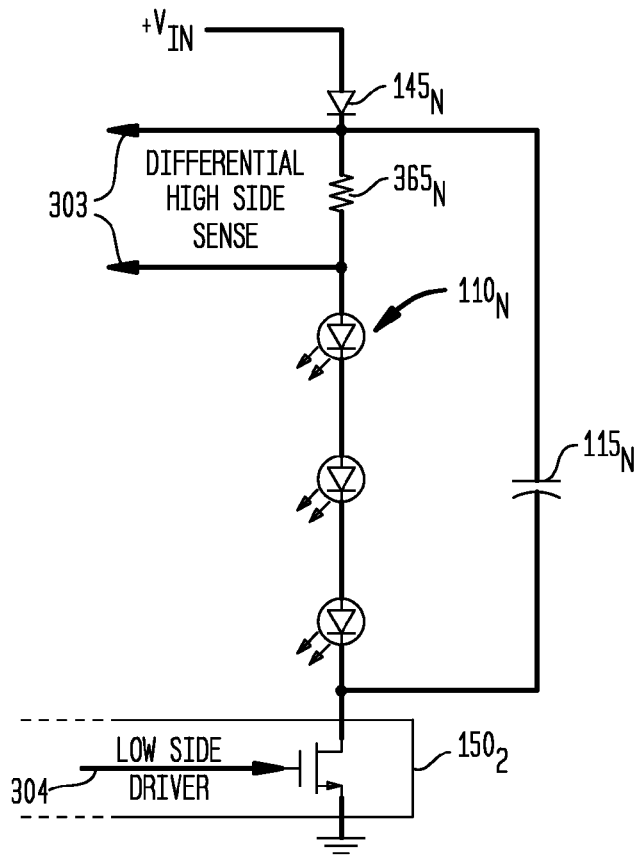
FIG. 9 is a circuit diagram illustrating differential high side sensing and low side driving of a series of LEDs in accordance with the teachings of the present disclosure.

Additional configurations for switching and sensing for the representative LED array driver circuits 100, 200 are illustrated in FIGS. 8, 9, 11, and 12. FIG. 8 is a circuit 300 diagram illustrating high side driving 301, as a representative switching implementation of a time-division multiplexer $150_1$, with low side sensing 302, for a series of LEDs $110_N$ in accordance with the teachings of the present disclosure. FIG. 9 is a circuit diagram illustrating differential high side sensing 303 and low side driving 304, as a representative switching implementation of a time-division multiplexer $150_2$, for a series of LEDs $110_N$ in accordance with the teachings of the present disclosure. As illustrated, the switching through the time division multiplexer 150 may be provided on either the high $150_1$ or low $150_2$ sides of each series of LEDs $110_1$, $110_2$, $110_3$, through $110_N$. High side switching (FIG. 8) may be slightly more expensive and slower than low side switching, but may provide greater accuracy. Accordingly, if the speed of system performance over its accuracy is more important, then high side sensing and low side switching may be selected. Different combinations of low and high side switching (drivers) and sensing circuits may be utilized to achieve the best performance of an LED array driver circuit 100, 200.

Figure 10:
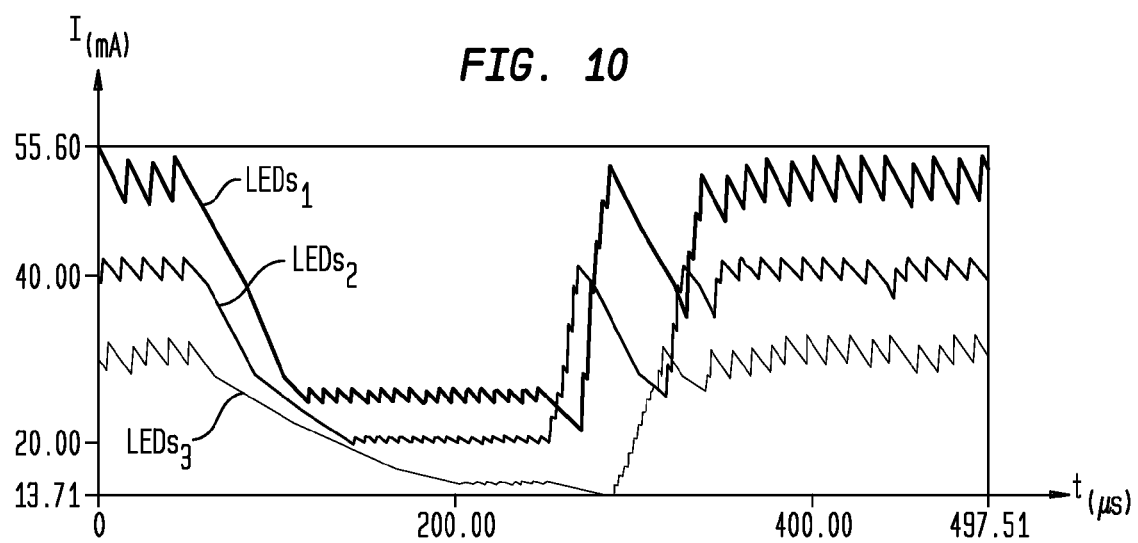
FIG. 10 is a graphical diagram illustrating simulation of a boost LED array driver circuit, for three series of LEDs, in accordance with the teachings of the present disclosure.

FIG. 10 is a graphical diagram illustrating simulation of a boost LED array driver circuit, for three series of LEDs, in accordance with the teachings of the present disclosure. FIG. 10 is illustrated for a $V_{in}$ of 5 V, a filter $115_N$ capacitance of 2.2 µF, a first series of three LEDs ($LEDs_1$) having a current setting of 50 mA, a second series of four LEDs ($LEDs_2$) having a current setting of 40 mA, and a third series of five LEDs ($LEDs_3$) having a current setting of 30 mA, with dimming to 50% at 100 µs and returning back to 100% after 240 µs. DC current ripple may be adjusted by a selection of appropriate values of filter capacitors $115_N$. In turn, this selection depends on the switching frequency of the switch $140$, $140_1$ and the cycle time of time division multiplexer $150$, with a higher switching frequency and smaller cycle time $T_c$ enabling a smaller filter $115_N$ capacitance to achieve the same ripple current. As illustrated in FIG. 10, time division modulation creates a relatively poor response, based on the time required to discharge or charge filter capacitors $115_N$. If the duty cycle of switching (of switch $140$, $140_1$) is small and cycle time $T_c$ is small, that may considerably affect the response of the system to the required accuracy and speed of change of lighting intensity, color temperature adjustments, or creating color effects.

Figure 11:
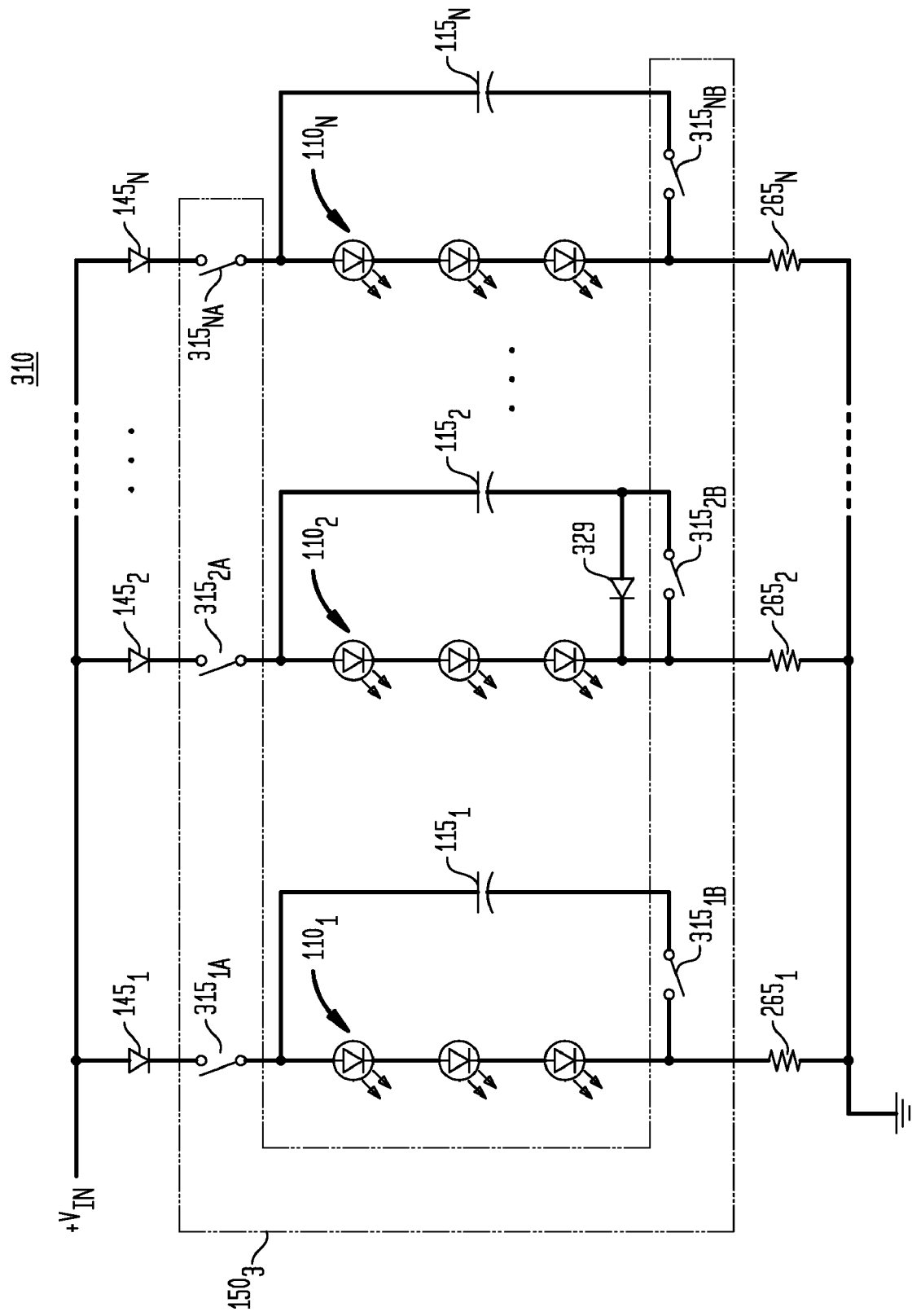
FIG. 11 is a circuit diagram illustrating a first configuration of an LED array for independent time division modulation in accordance with the teachings of the present disclosure.
Figure 12:
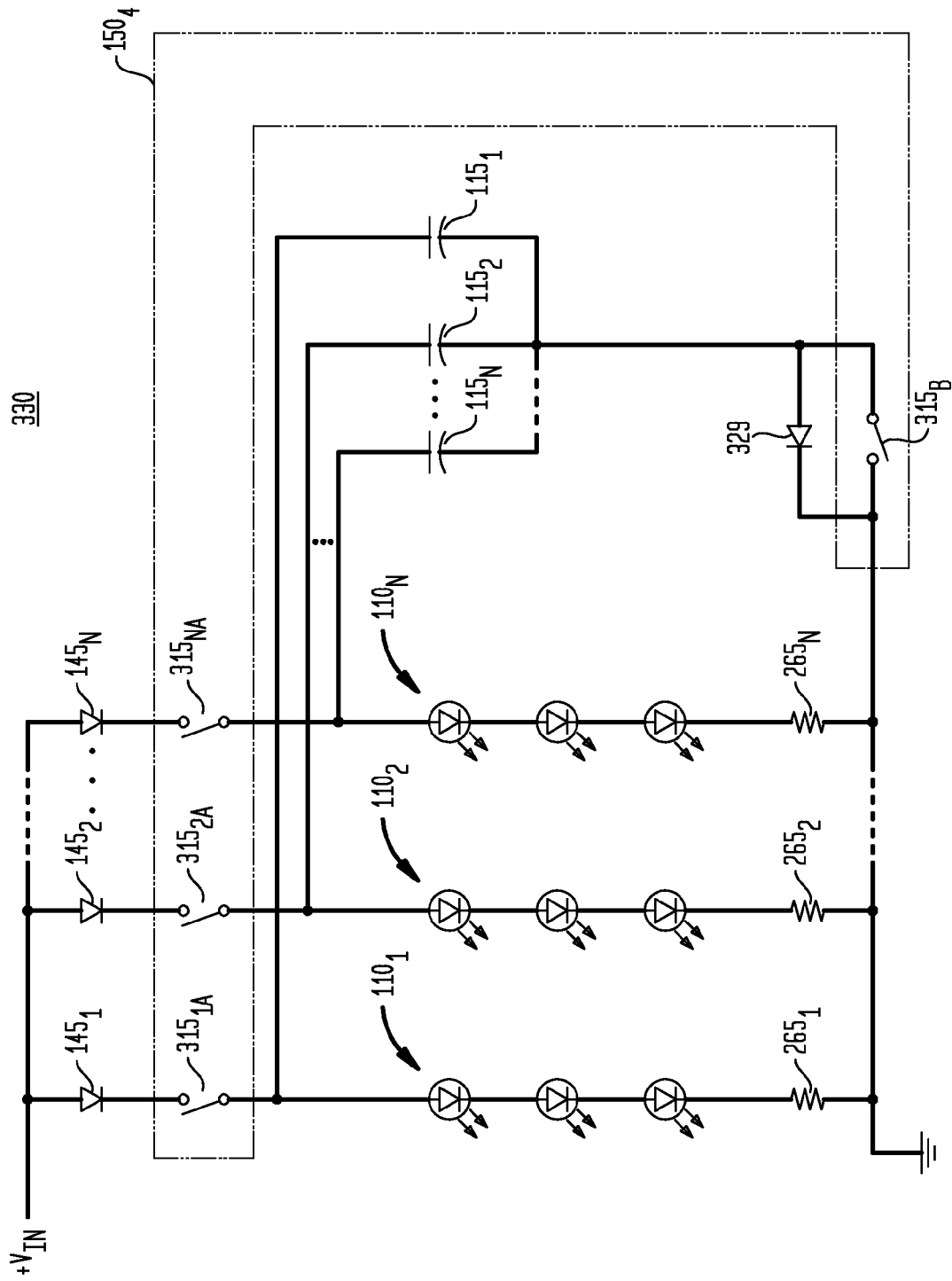
FIG. 12 is a circuit diagram illustrating a second configuration of an LED array for common time division modulation in accordance with the teachings of the present disclosure.

FIGS. 11 and 12 are circuit diagrams illustrating a first circuit 310 configuration and a second circuit 330 configuration, respectively, of an LED array for independent time division modulation. FIG. 13 is a graphical diagram illustrating simulation of LED current in a boost LED array driver circuit, for three LED strings implemented according to the configuration of circuit 310 of FIG. 11, with simultaneous switching as illustrated for a first series of three LEDs ($LEDs_1$) having a current setting of 50 mA, a second series of four LEDs ($LEDs_2$) having a current setting of 40 mA, and a third series of five LEDs ($LEDs_3$) having a current setting of 30 mA.

As illustrated in FIG. 11, the time division multiplexer 150 is implemented in a distributed manner, as the illustrated time division multiplexer $150_3$ having corresponding switches on both the high and low sides of each series of LEDs $110_1$, $110_2$, $110_3$, through $110_N$. As illustrated in FIG. 12, the time division multiplexer 150 is also implemented in a distributed manner, as the illustrated time division multiplexer $150_4$ having corresponding switches on the high side of each series of LEDs $110_1$, $110_2$, $110_3$, through $110_N$ and one switch on the low side of filter capacitors 115.

Also as illustrated in FIG. 11, the configuration of circuit 310 provides for fast switching speeds for the time division modulation, allowing independent time division modulation for each series of LEDs $110_1$, $110_2$, $110_3$, through $110_N$ by substantially simultaneously turning on/off corresponding pairs of switches $315_A$ and $315_B$ of the time division multiplexer $150_3$ for each series of LEDs $110_1$, $110_2$, $110_3$, through $110_N$, illustrated as corresponding switching pairs $315_{1A}$ and $315_{1B}$, $315_{2A}$ and $315_{2B}$, through $315_{NA}$ and $315_{NB}$. The edges of current pulses through the LEDs 110 may be very fast, on the order of tens to hundreds of nanoseconds, unless specifically slowed down to curtail electromagnetic interference (EMI). The switches $315_{1A}$ and $315_{1B}$, through $315_{NA}$ and $315_{NB}$, may be unidirectional (like MOSFETs with body diode conducting when capacitors 115 are being charged). For less power dissipation, a Schottky diode 329 may be connected in parallel with the MOSFET body diode.

When individual time division modulation of each series of LEDs $110_1$, $110_2$, $110_3$, through $110_N$ is not required, such as for energizing one or more of the series of LEDs at substantially the same time, such as in various groups, the time division multiplexer 150 may be simplified by having a corresponding plurality of high side switches $315_{1A}$, $315_{2A}$, through $315_{NA}$ and only one low side switch $315_B$ comprising time division multiplexer $150_4$, as illustrated in FIG. 12. This configuration of circuit 330 operates similarly to circuit 310, except for simultaneous connection or disconnection of filter capacitors 115 from series of LEDs $110_1$, $110_2$, $110_3$, through $110_N$. The current in the series of LEDs $110_1$, $110_2$, $110_3$, through $110_N$ is completely disabled when all switches 315 are turned off synchronously. To enable current flow in a selected series of LEDs $110_1$, $110_2$, $110_3$, through $110_N$, the switch $315_B$ and one of the switches $315_{1A}$, $315_{2A}$, through $315_{NA}$ (corresponding to the selected series of LEDs 110) are turned on.

Continuing to refer to FIGS. 11 and 12, each series, or any selected series of LEDs $110_1$, $110_2$, $110_3$, through $110_N$, may be separately and independently energized as follows, for each such series of LEDs 110: (1) establish DC current in each series of LEDs 110 by DC current regulation, keeping the one of the switches $315_{1A}$, $315_{2A}$, through $315_{NA}$ of the time division multiplexer $150_3$ or time division multiplexer $150_4$ in an on or off state as required to regulate the DC level of the current through the selected series of LEDs $110_1$, $110_2$, $110_3$, through $110_N$, and keeping one of the corresponding switches $315_{1B}$, $315_{2B}$, through $315_{NB}$, of FIG. 11, in a corresponding on or off state (or keeping the single switch $315_B$, of FIG. 12, in an on state continuously); (2) determining the corresponding time period (or duty ratio) for time-division modulation for each series of LEDs $110_1$, $110_2$, $110_3$, through $110_N$ (a duty ratio 100% will mean that the string is permanently on DC current regulation); (3) for each series of LEDs $110_1$, $110_2$, $110_3$, through $110_N$, monitoring elapsed time and/or counting the number of cycles "m" of the switching of the power converter 120, 220, and when either is substantially equal to the corresponding predetermined or set value, monitoring the current in inductor 130 of the converter 120, 220, and when the inductor 130 current is substantially zero, turning off the corresponding switch $315_{1A}$, $315_{2A}$, through $315_{NA}$ of the time division multiplexer $150_3$ or time division multiplexer $150_4$ and turning off the corresponding filter capacitor switches $315_{1B}$, $315_{2B}$, through $315_{NB}$, of FIG. 11, or turning off the single switch $315_B$, of FIG. 12, of a series of LEDs 110 to be disabled; (4) optionally determining the converter peak current $I_{p1i}$ based on source current $I_c$ and parameters of the active series of LEDs 110; and (5) at the end of the particular switching cycle of the converter, turning on the next one of the switches $315_{1A}$, $315_{2A}$, through $315_{NA}$ and corresponding filter capacitor switches $315_{1B}$, $315_{2B}$, through $315_{NB}$, of FIG. 11, (or the single switch $315_B$, of FIG. 11,) to energize the next selected series of LEDs $110_1$, $110_2$, $110_3$, through $110_N$.

Figure 14A:
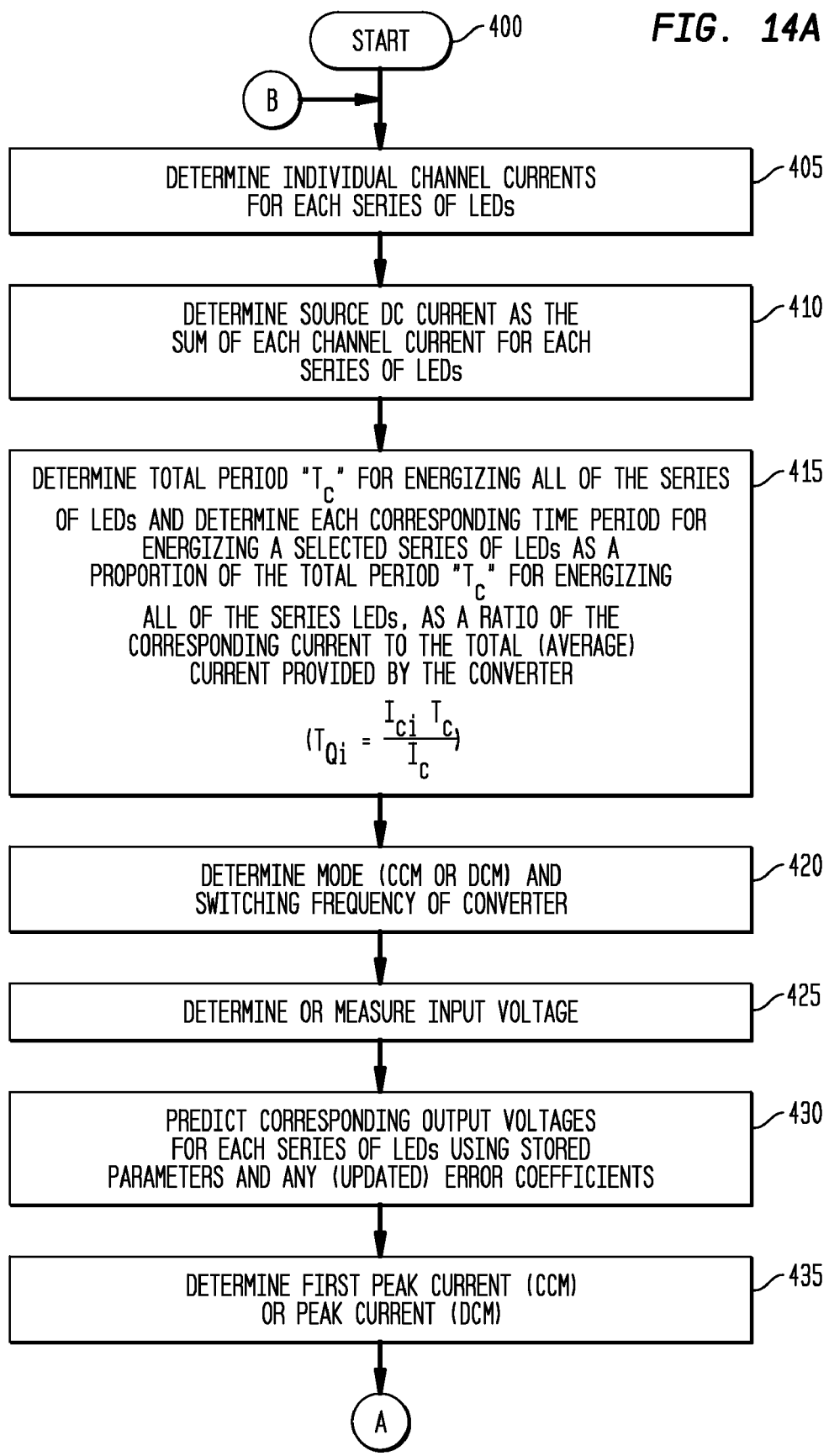
FIGS. 14A and 14B are flow diagram illustrating an representative method in accordance with the teachings of the present disclosure.
Figure 14B:
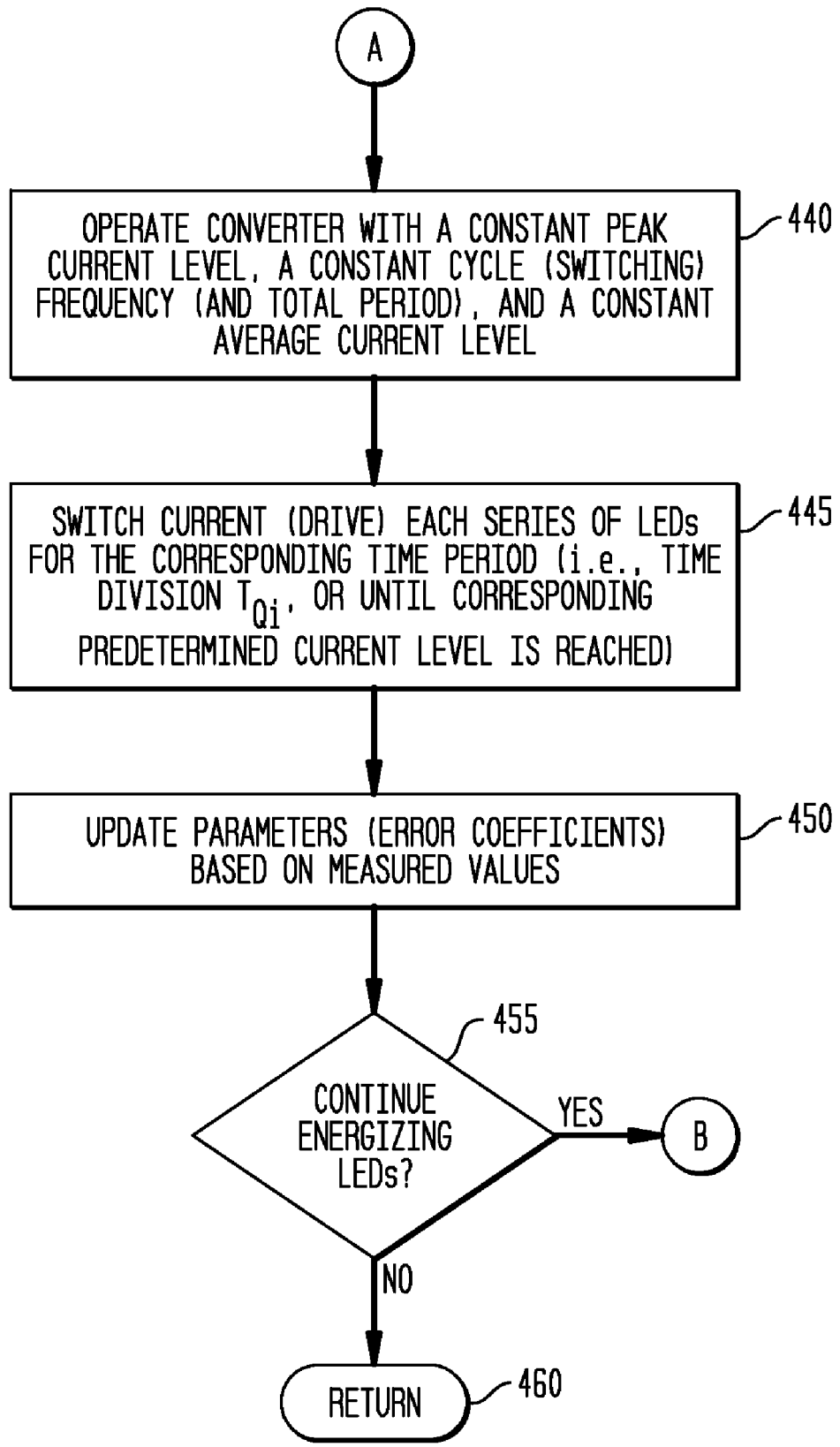

FIGS. 14A and 14B are flow diagrams illustrating a representative method of time-division modulation for separately and independently energizing a selected series of LEDs $110_1$, $110_2$, $110_3$, through $110_N$ in accordance with the teachings of the present disclosure, and provides a useful summary of representative features of the present disclosure. The method begins in FIG. 14A at start step 400, and continues to step 405 with determining corresponding values or levels of a DC current for each series (or channel) of LEDs $110_1$, $110_2$, $110_3$, through $110_N$. The method calculates the source DC current $I_c$ to be provided by the converter 120, 220, step 410, as substantially or about equal to the sum of each channel DC current $I_{ci}$, namely, $I_c = \Sigma_{i=1}^{i=n} I_{ci}$. A total period "T" is determined for switching current to all of the series of LEDs $110_1$, $110_2$, $110_3$, through $110_N$, and a corresponding time period for energizing each selected series of LEDs $110_1$, $110_2$, $110_3$, through $110_N$ is determined, step 415, as substantially equal to a proportion of the total period (for switching current to all of the series of light emitting diodes of the plurality of series of light emitting diodes), determined as a ratio of the corresponding current for the selected corresponding series of light emitting diodes to the total (average) current provided by the power converter, namely, $$T_{Qi} = \frac{I_{ci}T_c}{I_c}.$$

The operating mode of the converter is selected, namely, whether operating in continuous or discontinuous current mode, and a switching frequency of the power converter 120, 220 may also be selected (based on whether the power converter 120, 220 is to be operated in discontinuous or continuous current mode), step 420. Steps 405, 410, 415, and 420 may occur in any order or concurrently, and also may be performed in advance of the operation of the system or apparatus.

Continuing to refer to FIG. 14A, during operation of the system or apparatus, step 425, the operating input DC voltage of the converter 120, 220 is measured, such as across a voltage divider 240. In step 430, the output DC voltage for each series of LEDs 110 is predicted initially, such as by using various models or device parameters, and is then updated subsequently (using the error coefficients) based on measurements of the corresponding output voltage across the selected series of LEDs $110_1$, $110_2$, $110_3$, through $110_N$, typically determined as a corresponding voltage across a voltage divider 230. A first peak current is also calculated for CCM or a peak current for DCM, step 435. The prediction step 430 and determination step 435 may occur in any order or concurrently and also may be performed in advance of the operation of the system or apparatus (for an initial prediction).

As previously mentioned, the prediction of the output voltage across each series of LEDs $110_1$, $110_2$, $110_3$, through $110_N$ is typically based on device parameters, such as a manufacturer's specification of a forward voltage drop as function of a forward current of LED and the number of LEDs in series, for a selected series of LEDs $110_1$, $110_2$, $110_3$, through $110_N$. The output voltage of each selected series of LEDs $110_1$, $110_2$, $110_3$, through $110_N$ is also measured periodically to determine and/or update an error coefficient, such that the output voltage prediction is updated based on multiplying the predicted value by the error coefficient, for a more accurate output voltage prediction. This comparison of the predicted and measured voltages allows compensation for any effects of manufacturing production variations and tolerances, LED junction temperature variations, age drift and other factors, any and all of which can contribute to changes of the electrical characteristics of LEDs 110.

Referring to FIG. 14B, the power converter 120, 220 is then operated with the constant peak current, constant cycle time and constant DC current $I_c$ step 440, and with driving each selected series of LEDs $110_1$, $110_2$, $110_3$, through $110_N$ for the corresponding time-division $T_{Qi}$ time period or until the corresponding predetermined current level is reached, step 445, by switching each selected series of LEDs $110_1$, $110_2$, $110_3$, through $110_N$ on and off, i.e., coupling to and uncoupling from the output of power converter 120, 220, generally at times when the power converter 120, 220 is building current in the inductor 130 and not supplying current to the output load (i.e., when the inductor 130 current is substantially zero). When monitoring of corresponding current levels is utilized in step 445 to implement the time-division multiplexing of the present disclosure, all or part of step 415 may be omitted from the methodology. Following each energizing of a selected series of LEDs $110_1$, $110_2$, $110_3$, through $110_N$, or following the energizing of all of the series of LEDs $110_1$, $110_2$, $110_3$, through $110_N$ (e.g., at the end of a period "T"), all parameters of power converter 120, 220 operation and driving parameters for each series of LEDs $110_1$, $110_2$, $110_3$, through $110_N$ are updated (e.g., such as for use in predicting corresponding output voltages), step 450. When the energizing of the series of LEDs $110_1$, $110_2$, $110_3$, through $110_N$ is to be continued, step 455, the method returns to step 405 in FIG. 14A and iterates, and otherwise the method may end, step 460.

The apparatus, system, and method of driving a single or plurality of series of LEDs $110_1$, $110_2$, $110_3$, through $110_N$ may be used for controlling the performance of an LED system, for example, controlling brightness, color temperature, color control or dimming. Another significant and effective use of this method comprises local compensation of the drift of LED parameters due to junction temperature changes, age, manufacturing variations and tolerances, and other characteristics and parameters.

Another variation of the above time-division modulation may also be implemented. Rather than changing a duty ratio of each switching cycle of a power converter 120, 220, as is done with pulse-width modulation, the time-division modulation may also be implemented in DCM by skipping cycles of the power converter 120, 220, i.e., by shutting down the power converter 120, 220 for a predetermined number of cycles. For example, the number of cycles to be skipped is calculated, based on a full number of cycles $m_i$ and the required time periods $T_{QN}$ of the time-division modulation. The power converter 120, 220 is run in discontinuous current mode, with time-division modulation implemented by shutting down the power converter 120, 220 for a complete number of skipped cycles during one total period "T." In this embodiment, there are fewer switching events than a driver with standard PWM, thus reducing EMI and simplifying power converter 120, 220 design for controlling EMI.

The above description of the power converter 120, 220 is representative. Any topology of power converter 120, 220 may be utilized, such as buck, buck boost, or flyback. A direct conversion of AC input into a controlled current source may also be achieved by different AC/DC topologies. Any number of series of LEDs $110_1$, $110_2$, $110_3$, through $110_N$ may be implemented, using a corresponding number of switches and/or multiplexers. Also, if the actual output voltage across each of the series of LEDs $110_1$, $110_2$, $110_3$, through $110_N$ is expected to be the same, the output voltage may be measured for one selected series, rather than all, of LEDs $110_1$, $110_2$, $110_3$, through $110_N$.

Numerous advantages of the present disclosure are readily apparent. The various embodiments of the disclosure provide innumerable advantages for energizing a plurality of series (strings) of LEDs, using a single power converter and controller for an entire LED array, and does not utilize multiple, separate power converters and controllers for each LED string. The representative embodiments provide a multistring LED driver which controls current independently for each series of LEDs of the array, for corresponding effective color and brightness control, among other features, throughout the life span of the LEDs and corresponding changes in their functional parameters. In addition, the representative LED array drivers provide for local, faster and comprehensive LED regulation, providing local compensation of LED emission due to age and drift of such functional parameters, temperature changes of the LED junction, LED production characteristics variation, and variations of devices produced by different manufacturers. The representative LED array drivers are also backwards-compatible with legacy LED control systems, frees the legacy host computer for other tasks and allows such host computers to be utilized for other types of system regulation.

Although the disclosure has been described with respect to specific embodiments thereof, these embodiments are merely illustrative and not restrictive of the disclosure. In the description herein, numerous specific details are provided, such as examples of electronic and electrical components, materials, and structural variations, to provide a thorough understanding of embodiments of the present disclosure. One skilled in the relevant art will recognize, however, that an embodiment of the disclosure can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present disclosure.

Reference throughout this specification to "one embodiment," "an embodiment," or a specific "embodiment" means that a particular feature, structure, or characteristic described in connection with the embodiment is included in at least one embodiment of the present disclosure and not necessarily in all embodiments, and further, are not necessarily referring to the same embodiment. Furthermore, the particular features, structures, or characteristics of any specific embodiment of the present disclosure may be combined in any suitable manner and in any suitable combination with one or more other embodiments, including the use of selected features without corresponding use of other features. In addition, many modifications may be made to adapt a particular application, situation or material to the essential scope and spirit of the claimed subject matter. It is to be understood that other variations and modifications of the embodiments of the present disclosure described and illustrated herein are possible in light of the teachings herein and are to be considered part of the spirit and scope of the claimed subject matter.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the claimed subject matter, particularly for embodiments in which a separation or combination of discrete components is unclear or indiscernible. In addition, use of the term "coupled" herein, including in its various forms such as coupling or couplable, means and includes any direct or indirect structural, electrical or magnetic coupling, connection or attachment, or adaptation or capability for such a direct or indirect structural, electrical or magnetic coupling, connection or attachment, including integrally formed components and components which are coupled via or through another component. Furthermore, the disjunctive term "or," as used herein and throughout the claims that follow, is generally intended to mean "and/or," having both conjunctive and disjunctive meanings (and is not confined to an "exclusive or" meaning), unless otherwise indicated. As used in the description herein and throughout the claims that follow, "a," "an," and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present disclosure, including what is described in the summary or in the abstract, is not intended to be exhaustive or to limit the disclosure to the precise forms disclosed herein. From the foregoing, it will be observed that numerous variations, modifications and substitutions are intended and may be effected without departing from the spirit and scope of the claimed subject matter. It is to be understood that no limitation with respect to the specific methods and apparatus illustrated herein is intended or should be inferred. It is, of course, intended to cover by the appended claims all such modifications as fall within the scope of the claims.

It is claimed:

1. A method of providing power to a series of light emitting diodes in a plurality of series of light emitting diodes, the method comprising:
   generating a series current;
   measuring the series current using a first current sensor;
   using a controller, sequentially and separately switching the series current to each of the series of light emitting diodes in the plurality of series of light emitting diodes for a corresponding period of time; and
   using the controller, predicting an output voltage across a selected series of light emitting diodes using a plurality of parameters stored in a memory, wherein the plurality of parameters corresponds to the plurality of series of light emitting diodes.

2. The method of claim 1, further comprising:
   using the controller, switching no current to all remaining series of light emitting diodes while switching the series current to a selected series of light emitting diodes in the plurality of series of light emitting diodes.

3. The method of claim 1, further comprising:
   using the controller, determining a source current as about equal to a sum of a plurality of corresponding series currents through the plurality of series of light emitting diodes.

4. The method of claim 3, further comprising:
   using the controller, determining a total period for switching the series current to all of the series of light emitting diodes in the plurality of series of light emitting diodes.

5. The method of claim 4, further comprising:
   using the controller, determining a corresponding time period for switching the series current to a selected corresponding series of light emitting diodes as about equal to a proportion of the total period determined as a ratio of the corresponding series current for the selected corresponding series of light emitting diodes to the source current.

6. The method of claim 1, further comprising:
   storing, as a look up table in the memory, the plurality of parameters corresponding to the plurality of series of light emitting diodes.

7. The method of claim 1, further comprising:
   measuring a corresponding output voltage for each series of light emitting diodes in the plurality of series of light emitting diodes.

8. The method of claim 7, further comprising:
   using the controller, updating the predicted output voltage across a selected series of light emitting diodes in the plurality of series of light emitting diodes based on the corresponding measured output voltage.

9. The method of claim 1, further comprising:
   using a voltage sensor, determining a corresponding output voltage for each series of light emitting diodes in the plurality of series of light emitting diodes.

10. The method of claim 1, further comprising:
    using at least one second current sensor, measuring a corresponding current through each series of light emitting diodes in the plurality of series of light emitting diodes.

11. The method of claim 10, further comprising:
    using the controller, determining the corresponding period of time for switching the series current to a selected series of light emitting diodes based on a comparison of the measured corresponding current to a predetermined current for the selected series of light emitting diodes.

12. The method of claim 1, further comprising:
using the controller, determining the corresponding period of time for switching the series current to a selected series of light emitting diodes based on an integer multiple of a period of switching.

13. The method of claim 1, further comprising:
using the controller, switching the series current to a selected series of light emitting diodes in the plurality of series of light emitting diodes if the series current is substantially zero.

14. The method of claim 1, further comprising:
using the controller and in response to a first input, adjusting an output brightness of the plurality of series of light emitting diodes by modifying each corresponding period of time of current switching to each of the series of light emitting diodes.

15. The method of claim 1, further comprising:
using the controller and in response to a second input, adjusting an output color of the plurality of series of light emitting diodes by modifying a corresponding period of time of current switching to at least one of the series of light emitting diodes in the plurality of series of light emitting diodes.

16. A method of providing power to an array of light emitting diodes in a plurality of arrays of light emitting diodes, the method comprising:
generating an input current;
measuring the input current using a first current sensor;
using a controller, switching the input current to each array of light emitting diodes in the plurality of arrays of light emitting diodes for a corresponding period of time;
measuring a corresponding output voltage for each array of light emitting diodes in the plurality of arrays of light emitting diodes;
using the controller, predicting an output voltage across a selected array of light emitting diodes using a plurality of parameters stored in a memory, wherein the plurality of parameters corresponds to the plurality of arrays of light emitting diodes; and
updating the predicted output voltage based on a corresponding measured output voltage.

17. The method of claim 16, further comprising:
using a second current sensor, measuring a corresponding current through an array of light emitting diodes in the plurality of arrays of light emitting diodes; and
using the controller, determining the corresponding period of time for switching the input current to a selected array of light emitting diodes based on a comparison of the measured corresponding current to a predetermined current for the selected array of light emitting diodes.

18. A method of providing power to an array of light emitting diodes in a plurality of arrays of light emitting diodes, the method comprising:
generating an input current;
measuring the input current using a first current sensor;
using a controller, switching the input current to each array of light emitting diodes in the plurality of arrays of light emitting diodes for a corresponding period of time;
using the controller, predicting an output voltage across a selected array of light emitting diodes using a plurality of parameters stored in a memory, wherein the plurality of parameters corresponds to the plurality of arrays of light emitting diodes; and using at least one second current sensor, measuring a corresponding current through each array of light emitting diodes in the plurality of arrays of light emitting diodes.

19. The method of claim 18, further comprising:
using the controller, determining the corresponding period of time for switching the input current to a selected array of light emitting diodes based on a comparison of the measured corresponding current to a predetermined current for the selected array of light emitting diodes.

20. A computer-readable medium having instructions stored thereon that, in response to execution by a computing device, cause the computing device to:
generate a current;
measure the current using a first current sensor;
sequentially and separately switch the current to each of a series of light emitting diodes in a plurality of series of light emitting diodes for a corresponding period of time; and
predict an output voltage across a selected series of light emitting diodes using a plurality of parameters stored in a memory, wherein the plurality of parameters corresponds to the plurality of series of light emitting diodes.

21. The computer-readable medium of claim 20, further comprising instructions that, in response to execution by the computing device, cause the computing device to switch the series current to a selected series of light emitting diodes in the plurality of series of light emitting diodes while switching no current to all remaining series of light emitting diodes.

22. The computer-readable medium of claim 20, further comprising instructions that, in response to execution by the computing device, cause the computing device to determine a source current as about equal to a sum of a plurality of corresponding series currents through the plurality of series of light emitting diodes.

23. The computer-readable medium of claim 22, further comprising instructions that, in response to execution by the computing device, cause the computing device to determine a total period for switching the series current to all of the series of light emitting diodes in the plurality of series of light emitting diodes.

24. The computer-readable medium of claim 23, further comprising instructions that, in response to execution by the computing device, cause the computing device to determine a corresponding time period for switching the series current to a selected corresponding series of light emitting diodes as about equal to a proportion of the total period determined as a ratio of the corresponding series current for the selected corresponding series of light emitting diodes to the source current.

25. A computer-readable medium having instructions stored thereon that, in response to execution by a computing device, cause the computing device to:
generate an input current;
measure the input current using a first current sensor;
switch the input current to each array of light emitting diodes in a plurality of arrays of light emitting diodes for a corresponding period of time;
measure a corresponding output voltage for each array of light emitting diodes in the plurality of arrays of light emitting diodes;
predict an output voltage across a selected array of light emitting diodes using a plurality of parameters stored in a memory, wherein the plurality of parameters corresponds to the plurality of light emitting diodes; and
update the predicted output voltage based on a corresponding measured output voltage.

26. The computer-readable medium of claim 25, further comprising instructions that, in response to execution by the computing device, cause the computing device to:

use at least one second current sensor to measure a corresponding current through at least one array of light emitting diodes on the plurality of arrays of light emitting diodes; and using the controller, determining the corresponding period of time for switching the input current to a selected array of light emitting diodes based on a comparison of the measured corresponding current to a predetermined current for the selected array of light emitting diodes.

27. A computer-readable medium having instructions stored thereon that, in response to execution by a computing device, cause the computing device to:

generate an input current;

measure the input current using a first current sensor;

switch the input current to each array of light emitting diodes in a plurality of arrays of light emitting diodes for a corresponding period of time;

predict an output voltage across a selected array of light emitting diodes using a plurality of parameters stored in a memory, wherein the plurality of parameters corresponds to the plurality of light emitting diodes; and measure a corresponding current through each array of light emitting diodes in the plurality of arrays of light emitting diodes using at least one second current sensor.

28. The computer-readable medium of claim 27, further comprising instructions that, in response to execution by the computing device, cause the computing device to determine the corresponding period of time for switching the input current to a selected array of light emitting diodes based on a comparison of the measured corresponding current to a predetermined current for the selected array of light emitting diodes.

* * * * *

UNITED STATES PATENT AND TRADEMARK OFFICE
CERTIFICATE OF CORRECTION

PATENT NO. : 8,264,169 B2  
APPLICATION NO. : 13/019764  
DATED : September 11, 2012  
INVENTOR(S) : Shteynberg et al.

Page 1 of 1

It is certified that error appears in the above-identified patent and that said Letters Patent is hereby corrected as shown below:

In Fig. 1, Sheet 1 of 12, delete "CONVERTOR" and insert -- CONVERTER --, therefor at each occurrence throughout the Figure.

In Column 15, Line 6, delete "$T_B$" and insert -- $T_B$, --, therefor.

Signed and Sealed this  
Fifth Day of February, 2013

Teresa Stanek Rea  
*Acting Director of the United States Patent and Trademark Office*